(12) United States Patent
Chang

(10) Patent No.: US 8,073,458 B2
(45) Date of Patent: Dec. 6, 2011

(54) SYSTEM AND METHOD FOR AUTOMATED OPTIMIZATION OF SPECTRUM ALLOCATION

(75) Inventor: Randall C. Chang, Winter Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 470 days.

(21) Appl. No.: 12/328,191

(22) Filed: Dec. 4, 2008

(65) Prior Publication Data

US 2010/0142454 A1    Jun. 10, 2010

(51) Int. Cl.
*H04W 12/00* (2009.01)

(52) U.S. Cl. .............. 455/453; 455/450; 455/453.2; 370/395.41

(58) Field of Classification Search .......... 455/446–448, 455/450–454, 509–515; 370/395.41, 341, 370/310, 328–330, 338
See application file for complete search history.

(56) References Cited

U.S. PATENT DOCUMENTS

| | | | |
|---|---|---|---|
| 5,608,727 A | | 3/1997 | Perreault et al. |
| 6,832,129 B2 * | | 12/2004 | Lesh et al. ................. 700/213 |
| 7,349,880 B1 | | 3/2008 | Kitao |
| 7,460,837 B2 | | 12/2008 | Diener |
| 7,650,126 B2 * | | 1/2010 | Birru et al. ................ 455/226.1 |
| 2002/0006799 A1 * | | 1/2002 | Rappaport et al. ........... 455/446 |
| 2003/0032399 A1 | | 2/2003 | Slupe |
| 2004/0087310 A1 | | 5/2004 | Williamson et al. |
| 2006/0031082 A1 * | | 2/2006 | Amaitis et al. ................. 705/1 |
| 2006/0083205 A1 * | | 4/2006 | Buddhikot et al. ........... 370/338 |
| 2006/0143111 A1 | | 6/2006 | Mylet |
| 2006/0218392 A1 | | 9/2006 | Johnston |
| 2006/0234713 A1 | | 10/2006 | Oswal et al. |
| 2006/0262768 A1 | | 11/2006 | Putzolu |
| 2007/0106596 A1 | | 5/2007 | Bayyapu et al. |
| 2007/0274404 A1 | | 11/2007 | Papandriopoulos et al. |
| 2008/0052387 A1 | | 2/2008 | Heinz et al. |
| 2008/0108365 A1 | | 5/2008 | Buddhikot et al. |
| 2008/0183634 A1 | | 7/2008 | Sadler |
| 2008/0186882 A1 | | 8/2008 | Scherzer et al. |
| 2008/0221951 A1 | | 9/2008 | Stanforth et al. |
| 2008/0222019 A1 | | 9/2008 | Stanforth et al. |
| 2008/0222021 A1 | | 9/2008 | Stanforth et al. |

(Continued)

OTHER PUBLICATIONS

FCC 08-260, Second Report and Order and Memorandum Opinion and Order, Adopted Nov. 4, 2008 and Released Nov. 14, 2008.

(Continued)

*Primary Examiner* — Kamran Afshar
*Assistant Examiner* — Marisol Fahnert
(74) *Attorney, Agent, or Firm* — Renner, Otto, Boisselle & Sklar, LLP

(57) ABSTRACT

The present disclosure describes systems and methods that facilitate the allocation of spectrum for wireless communications. A database may be maintained that includes spectrum that has been offered by spectrum holders for use by spectrum users. Portions of the offered spectrum that have been allocated to spectrum users may be identified, the remainder of the offered spectrum being unallocated spectrum. A request specifying aspects of desired spectrum may be received from a user. A lack of available spectrum from the offered spectrum that fulfills the specified aspects in the request may be identified. Unallocated spectrum from a corresponding spectrum offer may be apportioned to fulfill the request with unallocated spectrum that matches the time duration and the geographic area aspects of the request and that has a frequency range that is shifted from the frequency range of the request for at least a portion of the time duration.

29 Claims, 8 Drawing Sheets

U.S. PATENT DOCUMENTS

2009/0046625 A1 2/2009 Diener et al.

OTHER PUBLICATIONS

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

International Search Report and Written Opinion from corresponding International Application No. PCT/US09/66209.

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FCC 04-167, pp. 1-180.

Prabhu, Krish et al., "Time for Action" Genuine Ideas, 2002, [retrieved online Feb. 1, 2008], <http://www.genuineideas.com/ArticlesIndex/TimeForAction.htm>.

* cited by examiner

SYSTEM AND METHOD FOR AUTOMATED OPTIMIZATION OF SPECTRUM ALLOCATION

TECHNICAL FIELD OF THE INVENTION

The technology of the present disclosure relates generally to wireless communications infrastructure and, more particularly, to a system and method for automated optimization of spectrum allocation.

BACKGROUND

Wireless networks and systems are becoming increasingly popular. But the deployment of wireless communications infrastructure is constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees.

A secondary market exists for the Commission licensees to sublease spectrum for use by other parties. Conventional secondary market leases involve the wholesaling of a spectrum holder's spectrum to another party. This is a one party to one party transaction in which use rights for an entire monolithic block of spectrum are "manually" transferred. These transfers have high overhead and transaction costs because they involve significant effort by an individual to seek a buyer or seller of spectrum rights, analyze spectrum suitability, and file compliance documentation once a transaction is made. Also, the current secondary market for licensed spectrum lacks the technology to accommodate complicated transactions involving the transfer of only a portion of a commission license's use rights in terms of geographic area, duration, and/or frequency.

SUMMARY

To facilitate the efficient allocation of spectrum in the secondary market for licensed spectrum, the present disclosure describes systems and methods for providing automated optimization of spectrum allocation.

According to one aspect of the invention, a computer implemented method for allocating spectrum for wireless communications includes maintaining a database of spectrum that has been offered by spectrum holders for use by spectrum users and identifying portions of the offered spectrum that have been allocated to spectrum users, the remainder of the offered spectrum being unallocated spectrum; receiving a request for spectrum from a user, the request specifying aspects of desired spectrum including a frequency range, a time duration, and a geographic area; identifying a lack of available spectrum from the offered spectrum to fulfill the specified aspects in the request due to at least one of a conflict with an existing spectrum allocation, a conflict with another spectrum request, or the lack of matching offered spectrum; and apportioning unallocated spectrum from a corresponding spectrum offer to fulfill the request with unallocated spectrum that matches the time duration and the geographic area aspects of the request and that has a frequency range that is shifted from the frequency range of the request for at least a portion of the time duration.

According to one embodiment of the method, the method further includes transferring use rights in the apportioned spectrum used to fulfill the request to the corresponding user.

According to one embodiment of the method, the method further includes hosting a transactional process between the user corresponding to the request and the holder of the apportioned spectrum so that the user and holder come to agreement on a price for the spectrum and, upon agreement, transferring use rights in the apportioned spectrum used to fulfill the request to the corresponding user.

According to one embodiment of the method, the allocated and unallocated spectrum is represented using a frequency versus time graph for a corresponding geographic location.

According to one embodiment of the method, each allocated spectrum segment and each unallocated spectrum segment has coordinates on the graph to define a corresponding polygon.

According to one embodiment of the method, the apportioning is carried out using a two-dimensional bin packing algorithm that is constrained in the time domain.

According to one embodiment of the method, the method further includes displaying the graph with the request graphically overlaid on the graph.

According to one embodiment of the method, the method further includes displaying a conflicting request by graphically overlaying the conflicting request on the graph.

According to one embodiment of the method, a total area of the request with respect to the graph equals a total area of the apportioned spectrum to fulfill the request.

According to another aspect of the invention, a system for allocating spectrum for wireless communications includes a memory that maintains a database of spectrum that has been offered by spectrum holders for use by spectrum users, the database identifying portions of the offered spectrum that have been allocated to spectrum users, the remainder of the offered spectrum being unallocated spectrum; a network interface over which a request for spectrum from a user is received, the request specifying aspects of desired spectrum including a frequency range, a time duration, and a geographic area; and a processor configured to identify a lack of available spectrum from the offered spectrum to fulfill the specified aspects in the request due to at least one of a conflict with an existing spectrum allocation, a conflict with another spectrum request, or the lack of matching offered spectrum; and apportion unallocated spectrum from a corresponding spectrum offer to fulfill the request with unallocated spectrum that matches the time duration and the geographic area aspects of the request and that has a frequency range that is shifted from the frequency range of the request for at least a portion of the time duration.

According to one embodiment of the system, use rights in the apportioned spectrum used to fulfill the request are transferred to the corresponding user.

According to one embodiment of the system, the processor is further configured to host a transactional process between the user corresponding to the request and the holder of the apportioned spectrum so that the user and holder come to agreement on a price for the spectrum and, upon agreement, to transfer use rights in the apportioned spectrum used to fulfill the request to the corresponding user.

According to one embodiment of the system, the allocated and unallocated spectrum is represented using a frequency versus time graph for a corresponding geographic location.

According to one embodiment of the system, each allocated spectrum segment and each unallocated spectrum segment has coordinates on the graph to define a corresponding polygon.

According to one embodiment of the system, the apportionment of unallocated spectrum is carried out using a two-dimensional bin packing algorithm that is constrained in the time domain.

According to one embodiment of the system, the processor is configured to generate display data from which the graph is displayed with the request graphically overlaid on the graph.

According to one embodiment of the system, the display data further includes display data to display a conflicting request by graphically overlaying the conflicting request on the graph.

According to one embodiment of the system, a total area of the request with respect to the graph equals a total area of the apportioned spectrum to fulfill the request.

According to yet another aspect of the invention, a computer readable medium storing executable code that when executed by a processor allocates spectrum for wireless communications includes code to maintain a database of spectrum that has been offered by spectrum holders for use by spectrum users, the database identifying portions of the offered spectrum that have been allocated to spectrum users, the remainder of the offered spectrum being unallocated spectrum; receive a request for spectrum from a user, the request specifying aspects of desired spectrum including a frequency range, a time duration, and a geographic area; identify a lack of available spectrum from the offered spectrum to fulfill the specified aspects in the request due to at least one of a conflict with an existing spectrum allocation, a conflict with another spectrum request, or the lack of matching offered spectrum; and apportion unallocated spectrum from a corresponding spectrum offer to fulfill the request with unallocated spectrum that matches the time duration and the geographic area aspects of the request and that has a frequency range that is shifted from the frequency range of the request for at least a portion of the time duration.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
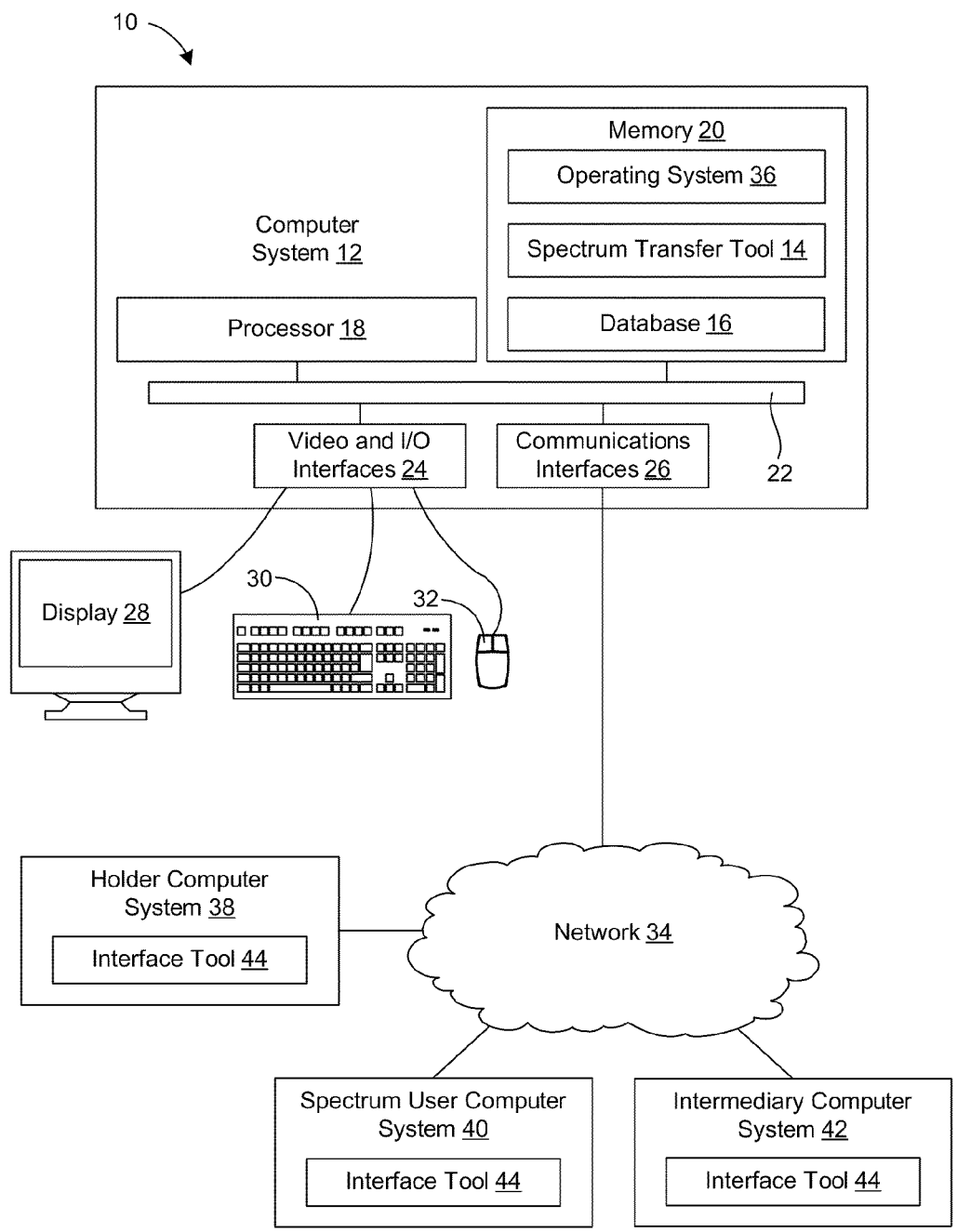
FIG. 1 is a schematic view of an exemplary automated spectrum exchange system.

Embodiments will now be described with reference to the drawings, wherein like reference numerals are used to refer to like elements throughout. It will be understood that the figures are not necessarily to scale.

A. OVERVIEW

A(1). Parties

In this document, described are various entities that may have a relationship to electromagnetic spectrum for use in wireless communications. One entity is a spectrum holder, or simply a holder. A holder is any entity having the authority to release spectrum use to another entity by granting the other entity access to the spectrum. The granting of access may be a temporary permission to use spectrum that is associated with the holder. Therefore, the access grant need not be a lease or a sublease, as defined by the FCC. The holder may be, but is not limited to, a government or regulatory agency (e.g., in the United States, the FCC), a Commission licensee (e.g., in the United States, an entity that has licensed spectrum directly from the FCC in the primary spectrum market), or a secondary market licensee. The term Commission licensee includes a holder that licenses spectrum from an appropriate regulatory entity in places other than the United States.

Another entity is a spectrum user, or simply a user. A spectrum user is any entity or wireless communications system that has a need for spectrum in order to carry out wireless communications. The spectrum user also may be a holder. A spectrum user may be distinguishable from a human operator of a computer-based system. Such a human operator also may be referred to as a "user," but the context of use will suffice to differentiate a spectrum user from a computer system user.

Another entity is a spectrum broker. A spectrum broker is any entity that hosts an automated spectrum exchange that matches available spectrum from holders to the spectrum needs of users. Use rights for the matched spectrum may then be transferred from the holder to the user under specified parameters, such as time duration, geography, transmission power, spectral mask, etc. Additional description of such an exchange of spectrum is described in U.S. patent application Ser. No. 12/042,543, filed Mar. 5, 2008, the disclosure of which is incorporated herein by reference in its entirety.

The spectrum broker may be a holder, a user, or a third party. In some instances, the term broker may be used to refer to a device or system that hosts a spectrum exchange function and is not to be confused with an entity that owns or operates the corresponding device or system.

Another entity is a spectrum intermediary. The spectrum intermediary may host a spectrum exchange and, therefore, may be the same entity as a spectrum broker. In other embodiments, there may be a spectrum intermediary and a spectrum broker. In some embodiments, the spectrum intermediary may be a market maker that acquires spectrum rights from a holder and makes that spectrum available to users. In other embodiments, the spectrum intermediary may be considered an investor or speculator that acquires rights from the holder to offer spectrum use rights in the spectrum to others. These use rights may be in the form of immediate or future use rights, options, futures, and so forth. Therefore, the intermediary may transfer all or part of its rights to offer spectrum use rights to another spectrum intermediary or to an actual spectrum user.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

A(3). General Considerations

This disclosure describes techniques that facilitate the automated optimization of spectrum allocation. As will become more apparent, the systems and methods allow for the automated apportionment of unallocated spectrum to meet the spectrum needs of one or more spectrum users. As a result, the transaction costs and complexity involved in locating and acquiring desired spectrum may be fairly low when using the disclosed systems and/or methods.

In many instances, a holder may be interested in apportioning some of its spectrum so that the holder may offer a resulting portion of spectrum to another entity, but the holder may maintain use rights in the remainder of the spectrum or allow another user to use other portions of the spectrum. A holder may apportion its spectrum according to any combination of geography (referred to as partitioning the holder's spectrum), frequency or channel plan (referred to as disaggregating the holder's spectrum), and time (referred to as time-slicing the holder's spectrum). For example, a license may be partitioned into one or more parts along any geographic boundary that is inside the original license area. Identifiable partition areas may be as small as a single city block (or smaller) or as large as a state or entire national region, as long as each partition fits inside the original license boundary. Disaggregation of licensed spectrum refers to the situation where a spectrum holder divides up a spectrum license by frequency or channels. For example, a 10 megahertz (MHz) license could be disaggregated into two 5 MHz parts, or ten 1 MHz parts, or any other combination totaling up to, but not exceeding the entire amount of licensed frequency. Therefore, using a combination of partitioning, disaggregation, and time-slicing, any part of a spectrum license in terms of geography, frequency (or channel) and/or duration may be identified, and rights associated with that portion of spectrum may be offered to another entity or reallocated back to the holder.

Similarly, a user may be interested in obtaining use rights in spectrum for a period of time, in a geographic area and/or for the support of throughput that is smaller than the total use rights supported by a holder's entire spectrum holding. These use rights may be acquired by obtaining spectrum use rights that have been apportioned from the larger spectrum holdings of another entity.

Each apportioned segment of spectrum for which access permission may be transferred may be identified by several components, and each component is defined by one or more variables. Exemplary components include a time window, a frequency-based spectral mask, a geography-based emission mask, and a transmitted power limit. Also, radios operating under spectrum use rights that have been transferred from a holder to a user may be controlled with a data object known as a spectrum certificate. The spectrum certificate may contain at least one spectrum-related variable under which the radio(s) associated with the spectrum user system is to engage in wireless communications. Additional details regarding the apportionment of spectrum and the issuance of spectrum certificates may be found in the above-mentioned U.S. patent application Ser. No. 12/042,543, filed Mar. 5, 2008.

The time window for the apportionment of spectrum may be a period of time that has a starting point given by a date and time and an ending point given by a date and time. Alternatively, the time window may be a period of time specified by a starting time and a duration. The time window may be as short as a second and as long as years.

The frequency-based spectral mask, as is known in the art, may be a mathematically defined set of lines applied to levels of radio transmission. The frequency-based spectral mask is generally intended to reduce interference by limiting excessive radiation at frequencies outside a certain bandwidth. Spectral masks often include a center frequency and/or a frequency range. Also, spectral masks often include an absolute power component or a relative power component. For an absolute power component, the frequency-based spectral mask may specify that transmission beyond a specified frequency range must be below a specified power value. For a relative power component, the frequency-based spectral mask may specify that transmission beyond a specified frequency range must be below a relative power value as determined by a function, such as a specified power value below the total amount of power being transmitted.

The geography-based emission mask may include a defined geographical boundary that radios operating in accordance with the emission mask may not appreciably transmit beyond. The geographical boundary specified by the geography-based emission mask may be a complex construct that relates to a contiguous or non-contiguous area. The amount of permissible transmission beyond the geographical boundary may be determined in an absolute manner or a relative manner. For an absolute manner, the geography-based emission mask may specify that transmission beyond the boundary must be below a specified power value. For a relative manner, the geography-based emission mask may specify that transmission beyond the boundary must be below a relative power value as determined by a function, such as a specified power value below the total amount of power being transmitted. In one embodiment, the function used for calculating the relative power value may include a distance parameter so that the relative power value may be calculated as a function of distance away from the boundary or other geographical reference.

The geography-based emission mask, alone or in combination with the time window, the frequency-based spectral mask, and the transmitted power limit, may be established to control an amount of interference that a user system generates with respect to continued operations of the spectrum holder and/or other users.

The transmitted power limit may be a power value that radios operating in accordance with the transmitted power limit may not exceed. The transmitted power limit may be absolute or relative. The transmitted power limit may be independent of the frequency-based spectral mask and/or the geography-based emission mask. The transmitted power limit may be expressed as an average power value (e.g., average total power), a peak power value, or similar value. Exemplary transmitted power limits are 500 milliwatts (mW), one watt (W), 1,000 watts, etc.

B. SYSTEM ARCHITECTURE

With reference to FIG. 1, illustrated is a schematic block diagram of a computer-based system 10 capable of executing computer applications (e.g., software programs). The system 10 may include a computer 12. The computer 12 may be configured to execute a spectrum transfer tool 14 and to store a database 16 that contains data regarding spectrum information that is used by the spectrum transfer tool 14.

In one embodiment, the spectrum transfer tool 14 is embodied as one or more computer programs (e.g., one or more software applications including compilations of executable code). The computer program(s) and/or database 16 may be stored on a machine (e.g., computer) readable medium, such as a magnetic, optical, or electronic storage device (e.g., hard disk, optical disk, flash memory, etc.).

To execute the tool 14, the computer 12 may include one or more processors 18 used to execute instructions that carry out a specified logic routine(s). In addition, the computer 12 may have a memory 20 for storing data, logic routine instructions, computer programs, files, operating system instructions, and the like. As illustrated, the tool 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices, and/or other memory components, plus associated drives, players, and/or readers for the memory devices. The processor 18 and the components of the memory 20 may be coupled using a local interface 22. The local interface 22 may be, for example, a data bus with accompanying control bus, a network, or other subsystem.

The computer 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown), and so forth. The communications interfaces 26 may include, for example, a modem and/or a network interface card. The communications interfaces 26 may enable the computer system 10 to send and receive data signals, voice signals, video signals, and the like to and from other computing devices via an external network 34 (e.g., the Internet, a wide area network (WAN), a local area network (LAN), direct data link, or similar systems). The interface between the computer 12 and any operatively interfaced device or network may be wired or wireless.

The memory 20 may store an operating system 36 that is executed by the processor 18 to control the allocation and usage of resources in the computer 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the tool 14, depend as is generally known by those with ordinary skill in the art. The operating system 36 also may control much of the user interface environment presented to a user, such as features of the overall graphical user interface (GUI) for the computer 12.

Using the computer 12, a user (e.g., a human operator) may use the tool 14 to carry out the functions described herein. In other embodiments, the computer 12 may be configured as a server that executes the tool 14 to host the functions for another computer, such as a computer system 38 associated with a spectrum holder, a computer system 40 associated with a spectrum user, and/or a computer system 42 associated with a spectrum intermediary. In one embodiment, the computer system 12 may be associated with a first spectrum intermediary. In this case, the computer system 42 may be omitted or the computer system 42 may be associated with a second spectrum intermediary. The client computer systems 38, 40, and 42 may have a similar architecture to the computer 12. For instance, the client computer systems may include a processor configured to execute software containing logical instructions that embody the functions of the client computer systems and a memory to store such software and related data. For example, the client computer systems each may execute an interface tool 44 that allows the respective systems 38, 40 and 42 to interface and share data with the spectrum transfer tool 14. In one embodiment, the interface tool 44 may be custom software. In another embodiment, the tool 14 may host an Internet-style website and the interface tool 44 may be an Internet browser application.

It will be apparent to a person having ordinary skill in the art of computer programming, and specifically in application programming for data collection, data processing, and/or expert systems, how to program the computer system 10 to operate and carry out logical functions associated with the spectrum transfer tool 14, the database 16, and the interface tool 44. Accordingly, details as to specific programming code and database structures have been left out for the sake of brevity. Also, while the tool 14 is executed by a general purpose computing device in accordance with a preferred embodiment, such functionality could also be carried out via dedicated hardware, firmware, software, or combinations thereof.

C. AUTOMATED SPECTRUM EXCHANGE SYSTEM AND METHOD

As indicated, spectrum in the United States and other areas of the world is licensed to commercial entities by a regulatory authority (e.g., the FCC in the U.S.). However, the present allocation of spectrum is inefficient and fails to meet current demands, leaving portions of licensed spectrum unused and/or underutilized. For example, licensed spectrum may be unused and/or underutilized during a certain period of time (e.g., a year, a month, a day, a minute, etc.), in a certain geographical area (e.g., a state, a city, a zip code, etc.), and/or for a certain frequency range (e.g., 2500 MHz-2506 MHz, etc.). Subsequent transfers of use rights associated with spectrum leases may be made in a secondary market, but such transfers are generally limited to the entire monolithic block of spectrum that is licensed to the spectrum holder. Furthermore, the conventional process of transferring spectrum use rights is costly, time consuming, and complex. Each spectrum-related transaction involves extensive searching and a complicated verification procedure in frequency, geographical, and time dimensions. And certain rules and regulations defined by the regulatory authority must be followed. Thus, the current secondary market for licensed spectrum fails to provide for the efficient and economical allocation of unused and/or underutilized spectrum.

The disclosed approach provides a mechanism to automate the transfer of spectrum use rights. The automated spectrum exchange arranges apportioned spectrum leases on the basis of frequency range, time interval, and geographical area to facilitate the efficient allocation of unused spectrum. The disclosed approach utilizes automated processes to create a spectrum exchange that matches spectrum offers posted by spectrum holders with spectrum queries submitted by spectrum users. In the automated spectrum exchange, spectrum is treated as a tradable commodity that may be acquired by a user through a transactional process with the spectrum holder. For example, spectrum users may submit bids to compete for access to spectrum being offered by spectrum holders, and spectrum holders may transfer the offered spectrum to the highest bidder. Furthermore, the disclosed approach facilitates the apportionment of spectrum on the basis of frequency range, geographical area, and time interval by providing a graphical representation that may be used to specify one or more aspects of specific spectrum. As will be appreciated, the disclosed approach allows transactions involving the efficient allocation of unused and/or underutilized licensed spectrum to be made faster, cheaper, and more precisely.

As an example, suppose that a holder of a spectrum license wishes to apportion unused spectrum covered by their license into several relatively small geographic regions (e.g., a zip code) in order to offer temporary access to the apportioned spectrum to one or more users (e.g., a temporary transfer of spectrum use rights for immediate use by the user). In this circumstance, identifying and apportioning unused spectrum along spectral, geographical, and temporal dimensions would conventionally require a highly manual procedure with high overhead and transaction costs. In addition, FCC rules would need to be followed to the extent that the transaction may be undermined due to the time and cost involved in the compliance effort. Furthermore, in order to locate interested spectrum users, the holder would have to undertake a one-on-one marketing scheme in which the holder seeks out individual users with spectrum needs that exactly match the holder's spectrum offer. As a result, the costs and regulatory delay would make an otherwise efficient use of spectrum into an uneconomical and impractical undertaking.

The disclosed approach addresses the above issues by using, for example, the spectrum transfer tool 14 to create an automated spectrum exchange that quickly and cost-effectively matches spectrum needs to available spectrum offers. The spectrum exchange requires minimal information to be conveyed between the holder and user for the temporary transfer of spectrum use rights. Via the spectrum exchange, parties may track historical and current data regarding spectrum licenses, spectrum usage, and spectrum access right transfers so that a determination may be made of what spectrum is being used and where. The holder may have access to financial data in terms of how much was paid for previous spectrum use transfers so as to appropriately price apportioned spectrum. Users may have access to the same historical price data.

Through the execution of the spectrum transfer tool 14, computer technology is leveraged to facilitate the creation of an automated spectrum exchange. For example, an exchange transaction process may take place using the spectrum transfer tool 14, which may be made available to holders, users, and/or intermediaries by a spectrum broker.

In the following paragraphs, automated processes that support the establishment of an automated spectrum exchange in accordance with the disclosed approach will be described. In particular, a description of how a spectrum holder and a spectrum user interact with the spectrum transfer tool 14 and the functions of the spectrum transfer tool 14 will be provided. This will be followed by a description of the transactional process that may occur between parties involved in a spectrum exchange transaction. There will also be a description of how the spectrum transfer tool 14 may be used to define a geographical area of specific spectrum and graphically represent spectrum usage in the defined geographical area.

Figure 2:
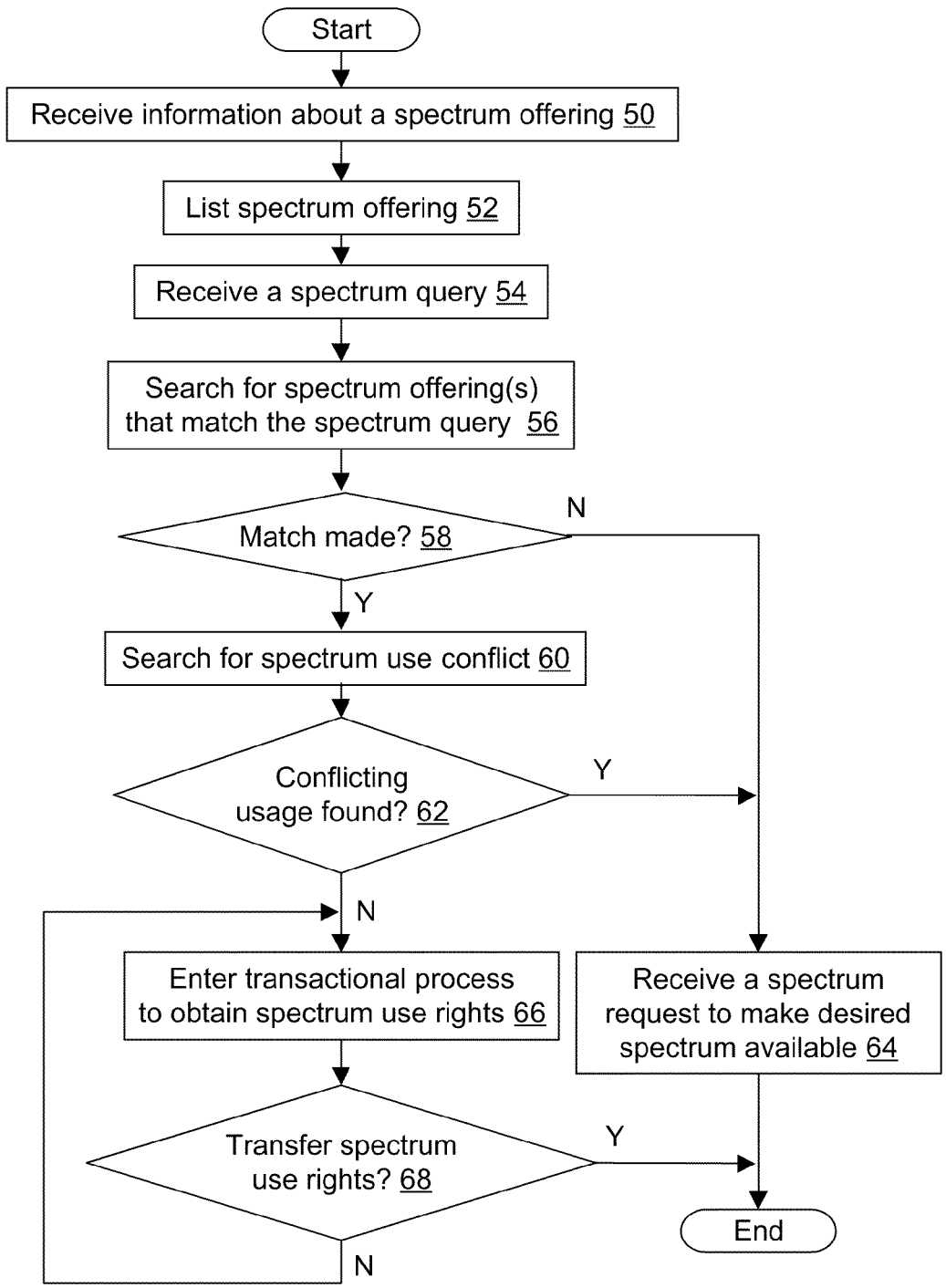
FIG. 2 is a flow chart representing an exemplary method of implementing an automated spectrum exchange system.

FIG. 2 illustrates an exemplary logical flow of steps that may be used to support the establishment of an automated spectrum exchange according to the disclosed approach. This process may start in block 50 where the spectrum transfer tool 14 receives spectrum information from a spectrum license holder. The holder may provide information about spectrum that the holder wants to make available for transfer as a spectrum offering using the spectrum exchange. The spectrum offering may encompass a holder's entire licensed area. Or the spectrum offering may cover only a portion of the holder's licensed area. Alternatively, the holder may provide information about spectrum that the holder wants to "reserve" (e.g., make unavailable for transfer). For example, a portion of the holder's licensed area may be designated for use by the holder or may have been previously transferred to another user.

The spectrum information provided by the holder may be entered into the spectrum transfer tool 14 through the interface tool 44 of the holder computer system 38. These tools 14, 44 may establish a graphical user interface that allows the holder to quickly and efficiently define desired aspects of specific spectrum (see, e.g., the discussion of FIGS. 4-5 below). Aspects of spectrum specified by the received information may include frequency range or channel plan, geographical area, time interval, spectral mask, initial asking price, reserve price, holder identifier, offering type, etc.

If a holder is new to the spectrum exchange (e.g., is not a registered member), the holder may be asked to complete a member registration process using, for example, the spectrum transfer tool 14. The registration process may include verification of the holder's identity and current FCC licenses. After passing verification, the holder may use the spectrum transfer tool 14 to define aspects of the holder's licensed spectrum. For example, the holder may designate the location of the holder's licensed spectrum using the spectrum transfer tool 14, as described below in relation to FIGS. 4-5. Once the holder's entire licensed spectrum has been defined, the holder may select a portion of licensed spectrum to "post" or "list" as an spectrum offering on the spectrum exchange using the spectrum transfer tool 14, as described herein. Additional details regarding spectrum holder registration may be found in U.S. patent application Ser. No. 12/327,912, filed Dec. 4, 2008, the disclosure of which is incorporated herein by reference in its entirety.

The logical flow may then proceed to block 52 where the spectrum transfer tool 14 stores the information received from the holder. For example, the information regarding a spectrum offering may be stored in a spectrum offering database that stores all spectrum offerings that have been "posted" (also referred to as "listed") on the spectrum exchange. A spectrum offering is considered to have been "posted" or "listed" on the spectrum exchange once the information is stored in the spectrum offering database and made available for search by a spectrum user, as discussed below. In one embodiment, the spectrum offering database may be included in database 16.

In block 54, the spectrum transfer tool 14 receives a query from a spectrum user that is interested in searching the spectrum exchange for specific spectrum. Queries also may be submitted by a spectrum intermediary, but the following logical flow will be described in the exemplary context of a user that seeks spectrum. The spectrum query is comprised of search criteria that specify one or more aspects of spectrum. The spectrum aspects specified by the search criteria may include, for example, frequency range or channel plan, geographical area, time interval, application and desired throughput, or any combination thereof. The user's spectrum query may be entered into the spectrum transfer tool 14 through the interface tool 44 of the user computer system 40. The tools 14, 44 may establish a graphical user interface similar to that used by the holder, as discussed above. The spectrum query may be stored in a spectrum demand database. In one embodiment, the spectrum demand database may be included in database 16.

Next, in block 56 the spectrum transfer tool 14 may search, for example, the spectrum offering database for spectrum offerings that match the received spectrum query. The spectrum transfer tool 14 may include a matching engine for comparing the spectrum queries and the spectrum offerings based on, for example, a geographical area, an upper frequency, a lower frequency, a center frequency, a start time, an end time, an application type, an FCC part number, or any combination thereof.

For example, a user may specify a desired geographical area, but may not specify a frequency range of the desired spectrum. A search of the spectrum offering database based on the specified criteria will return any spectrum offering, regardless of the pertinent frequency range, within the user-specified geographical area. In one embodiment, the matching engine may compare the geographical aspects of a spectrum query and a spectrum offering based on unique grid identifiers. As described below with reference to FIG. 5, the spectrum transfer tool 14 may be used to uniformly partition a larger geographical region into a plurality of grid cells. A party may specify a geographical area of interest by selecting one or more corresponding grid cells. Each grid cell is assigned a unique grid identifier, or GID, which may have, for example, a numerical value. This way, the GID transforms geographical information into a standard format, which allows for easy comparison of a spectrum offering and a spectrum query based on geographical area. For example, for a search based on geographical area, the matching engine may search the spectrum offering database for a spectrum offering that has the same GID as specified by the search criteria.

In another example, a user may specify a geographical area and a frequency range of desired spectrum. A search of the spectrum offering database based on these criteria will return any spectrum offering in the specified geographic area that matches the specified frequency range. In one embodiment, the matching engine may compare a spectrum query to spectrum offerings based on frequency-geography identifiers (FGIDs). As described below with reference to FIG. 5, an FGID represents frequency and geography information in a standard format. The spectrum transfer tool 14 may assign an FGID to each spectrum offering and spectrum query, so that the frequency and geography information may be matched in an easy manner. For example, where a user's spectrum query specifies geographical area and frequency range, the matching engine may search the spectrum offering database for spectrum offerings that have an FGID that is the same as the FGID assigned to the spectrum query.

The matching engine also may be configured to match the spectrum query to spectrum offerings based on other criteria, such as application type and desired throughput, FCC part number, and/or specific radio equipment of the user. For example, the matching engine may search for offered spectrum that may be used to implement the type of application specified by the search criteria, considering the appropriate regulatory requirements. For instance, the user may specify a geographical area and use information, together with an amount of desired throughput. Use information may be in the form of a type of wireless communication application, such as cellular telephone service, WiFi, WiMax, private wireless LAN, two way radio service, etc. Other exemplary forms of use information include an FCC part number and/or specific radio equipment. The spectrum transfer tool may translate the specified use information into corresponding frequency values that may satisfy the planned use. These values and the specified geographical area may be matched against the spectrum offerings. In another approach, the frequency of spectrum associated with the offerings may be translated into a predetermined set of classification values and the specified use information may be classified using the same classification values. Then, matching may be made by matching classification values and other considerations, such as time and/or geography. In these approaches, matching is made by effectively comparing the frequency and bandwidth needs of the user to the communications support capabilities of the available spectrum.

The matching engine may be configured to operate on an "all or none" basis, where a match is made when each spectrum aspect specified by the search criteria is exactly met by corresponding aspects of the spectrum offering. For example, a match is made when the frequency criteria, geographical area (e.g., GID), and time interval of a spectrum offering exactly matches the values specified by the search criteria. The "all or none" option may be a default setting of the matching engine. Alternatively, a party may select the "all or none" option when submitting a search.

In one embodiment, a match may also be made when the search criteria are narrower than the matching aspects of the spectrum offering. That is, a match may be made when the desired spectrum is included within the spectrum offering's larger geographical area, larger frequency range or communications support capabilities, and/or larger time interval. For example, when comparing geographical aspects, a match may be made when the GID associated with the search criteria matches one of the GIDs specified by the spectrum offering.

When a user seeks spectrum that falls within a larger spectrum offering, the holder may have the option of refusing to transfer use rights for the smaller portion of spectrum. For example, if the offered spectrum is in high demand, the holder may benefit financially from waiting for a spectrum user that might desire the entire spectrum offering or a larger portion thereof. In this situation, the holder may refuse to transfer, for example, only one of the ten grid cells included in the spectrum offering. However, using the below-described spectrum exchange transactional process (see discussion of FIG. 3), the parties may come to an agreement regarding price, geographical area, frequency range, time interval, etc. On the other hand, if the spectrum is in low demand, the holder may be eager to transfer use rights for any portion of the larger spectrum.

In other embodiments, the matching engine may be configured to search for a "partial match," where the spectrum query partially matches a spectrum offering based on one or more aspects of spectrum. In one embodiment, the matching engine may be configured to search for a partial match when the "all or none" option is turned off. In another embodiment, the "all or none" matching requirement may be applied individually to each aspect of spectrum, rather than the spectrum query as a whole. Also, a partial match may be made when a spectrum offering matches, exactly or inclusively, the frequency range, the time interval and/or the geographical region (e.g., FGID) specified by the search criteria. That is, a match may be made when there is at least partial overlap among each considered criterion. As will be appreciated, partial overlaps for any combination of time, frequency and geography may be made. As an example, if the user specifies a particular zip code and an offering is for the entire state in which the zip code is found, a match for the geographic region may be made since the user specified area is included in the area of the offering. As another example, if the user specified time is for New Year's Day (e.g., to provide wireless services during a parade) and the time period in the offering is for November 1st to February 28th of the corresponding year, a match may be made. As yet another example, if the user specified March 1st to May 31st and the time period in the offering is for November 3rd of the preceding year to April 15th of the same year, a partial match may be made. The user may be interested in this partial match to satisfy some of its planned spectrum use (e.g., from March 1st to April 15th) and may seek other spectrum to use for the remainder of the time period. The same partial matching may be made for other criteria, such as geographic area and frequency.

By returning partial matches based on a user's search criteria, the automated spectrum exchange promotes the efficient allocation of spectrum use rights. For example, when an exact match is not made based on the submitted search criteria, the spectrum transfer tool 14 may provide the user with partially matching spectrum offerings that are available for the same frequency range but in other geographical areas. The spectrum transfer tool 14 may present these alternatives in the form of a spectrum usage map as described in relation to FIG. 5 below. Based on the spectrum usage map, the user is able to discern which spectrum is available and devise a new query accordingly. For example, the user may submit a new query for spectrum within another geographical area but pertaining to the same frequency range as before. In this manner, the automated spectrum exchange is able to meet the needs of various users.

In the case of a partial match, the spectrum user may select more than one spectrum offering in order to completely fulfill the user's spectrum needs. The spectrum exchange allows users to combine different spectrum offerings to meet spectrum needs as long as regulatory compliance is maintained. Thus, for example, where the matching engine finds a spectrum offering that matches the first half of the time interval specified by the search criteria, the matching engine may also find one or more spectrum offerings that match the second half of the specified time interval.

In block 58, the spectrum transfer tool 14 determines whether one or more matches have been made. If a positive determination is made in block 58, the spectrum transfer tool 14 retrieves the information associated with each matched spectrum offering and displays the offering information for review by the spectrum user. From among the search results, the user may select which spectrum offering to pursue using the transactional process described below with reference to FIG. 3. If a negative determination is made in block 58, the spectrum transfer tool 14 informs the user that no spectrum offerings match the spectrum query. In this instance, the user may choose to revise the current search criteria or submit a new query. For example, the user may submit a new query for spectrum at a different frequency range and/or in a different geographical area. As will be appreciated, a user may submit several unsuccessful spectrum queries before locating a satisfactory spectrum offering or offerings.

In an alternative embodiment, the user may browse spectrum offerings without submitting a query. The user may identify spectrum offering of interest and select that offering to attempt to acquire use rights in some or all of the spectrum identified in the offering. In this case, the logical flow may commence from the point of a positive determination in block 58.

In block 60, the spectrum transfer tool 14 determines whether current spectrum usage and previously arranged spectrum transfers involving future spectrum use conflict with the user's ability to use spectrum associated with a matched spectrum offering. For example, the spectrum transfer tool 14 may check a spectrum usage database to determine whether, for example, the matched spectrum is available for transfer during the time interval specified by the spectrum query. A spectrum usage database stores information regarding which portions of offered spectrum have been transferred using the spectrum exchange and which portions are still available for transfer. When the time interval of a temporary transfer of spectrum ends, the spectrum usage database is updated accordingly. For example, an expired transfer may be removed from the usage database. Conflicting spectrum usage is found, for example, if spectrum use rights during the desired time interval have been transferred to another user or are reserved by the spectrum holder. Also, the spectrum use database may include knowledge regarding how spectrum is or will be used. The determination made in block 60 may include using this knowledge to identify potential interference between the current or future use of spectrum and the intended use of the matched spectrum. Therefore, the analysis of block 60 may include consideration of the user's planned use for the spectrum and/or time interval specified in the spectrum query of block 54. In one embodiment, the spectrum usage database may be included in database 16. Alternatively, the spectrum usage database may be included in the spectrum offering database.

In block 62, the spectrum transfer tool 14 determines whether conflicting spectrum usage has been found. If a positive determination is made in block 62, the user is notified that current spectrum usage conflicts with the matched spectrum. At this point, the user may choose to modify the search criteria and submit a new query, or concentrate on another matched offering, if present.

In some instances, a user may post a spectrum request if suitable spectrum is not available on the spectrum exchange. In block 64, the spectrum transfer tool 14 may provide a user with the option of submitting a request to which holders may respond by posting a spectrum offering that would satisfy the request or otherwise make spectrum available to the user. Therefore, a request to make spectrum available may be used to solicit new spectrum offerings from, for example, a holder of spectrum that can fulfill the spectrum request or a spectrum intermediary that may be able to arrange a match. Requests to make spectrum available may be stored in a spectrum request database, and may be made available for viewing by holders, users, and intermediaries. Also, if a holder makes spectrum available by way of an offering that matches the request, the spectrum transfer tool 14 may identify the match and alert the user to the match. For example, the logical flow may return to block 58 and a positive determination may be made. Additional description of requests to make spectrum available will be provided beginning with FIG. 7 below.

If a negative determination is made in block 62 (e.g., no conflicting spectrum usage is found), in block 66 the spectrum transfer tool 14 may prompt the user to enter a transactional process with the holder of the matched spectrum in order to obtain the associated use rights. Exemplary transactional processes between a holder and a user will be discussed in more detail in relation to FIG. 3 below.

In block 68, the spectrum transfer tool 14 determines whether use rights for the matched spectrum have been successfully transferred to the user. If a negative determination is made in block 68, the spectrum transfer tool 14 may re-prompt the user to undergo the transactional process to obtain the matched spectrum's use rights. Alternatively, the logical flow may end, the user may enter the transactional process for a different matching spectrum offering, and/or the user may submit a request. If a positive determination is made in block 68, the spectrum transfer tool 14 records the details of the transferred spectrum in the spectrum usage database.

Figure 3:
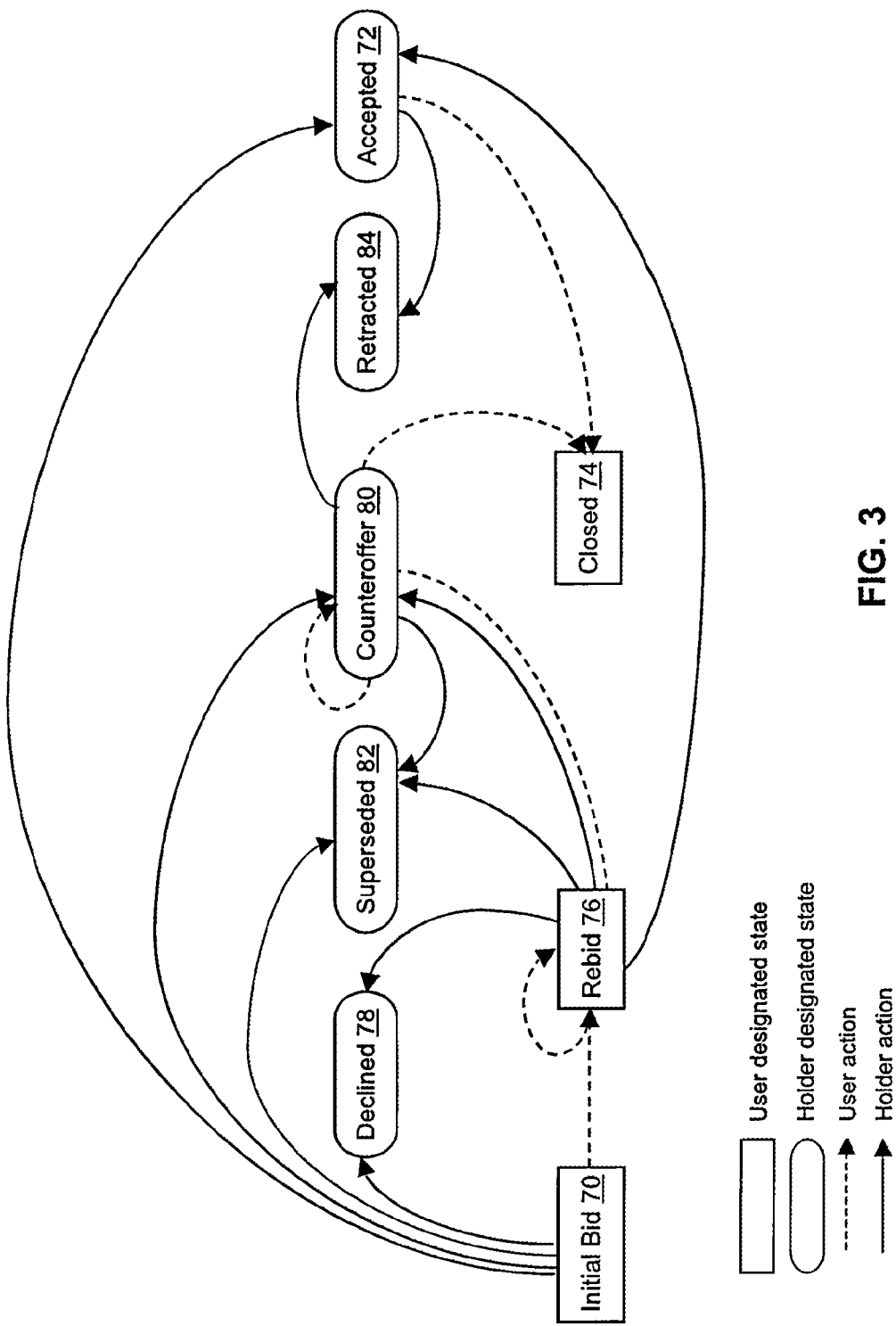
FIG. 3 is a schematic diagram of state transitions in an exemplary spectrum exchange transaction between a spectrum holder and user.

With additional reference to FIG. 3, illustrated is an exemplary transactional state transition diagram that shows a combination of possible transactional activities that may occur between parties involved in a spectrum exchange transaction. When listing a spectrum offering on the spectrum exchange, the holder may specify whether the spectrum offering is a "make an offer" type offering or an "auction" type offering. For example, in a make-an-offer-type offering, the user may submit an initial bid and the holder may accept or reject the bid. Alternatively, the holder may make a counteroffer. In an auction-type offering, for example, there may be a specific time period during which the auction is open and one or more users may submit bids for a spectrum offering. At the end of the auction time, the highest bidder may acquire the use rights associated with the auctioned spectrum offering. The following description of the transactional process encompasses both types of offerings, and reference will be made to any differences in transactional states between the two offering types.

Each spectrum offering, bid, rebid, and counteroffer may include a price (e.g., a total monetary value, a price per megahertz (MHz), a price per population in the associated geographical area, or a combination of price determining criteria). The price may be in terms of actual monetary or economic consideration, or in terms of artificial currency (e.g., as a mechanism to allocate spectrum between competing systems or entities, such as between different military branches, or between client access and backhaul). A spectrum offering may indicate a "reserve price" (e.g., for an auction-type offering) or an "ask price" (e.g., for a make-an-offer-type offering). The reserve or ask price is the lowest price that the holder may be willing to accept for the transfer of use rights. The reserve and/or ask price may remain private at the holder's request. Alternatively, the ask price may be provided to users as part of the spectrum offering information.

Each spectrum offering, bid, rebid, or counteroffer may specify aspects of spectrum, such as geography, frequency, and/or time. For example, the bid, rebid, or counteroffer may be submitted for the entire spectrum offering or the bid, rebid, or counteroffer may specify only a portion of the offered spectrum based on geography, frequency, and/or time. For example, a bid may be made for only half of the geographical area included in a spectrum offering. Through the spectrum exchange transactional process, the parties may come to an agreement regarding price, geographical area, frequency range, time interval, etc. If changes are made relative to the original offering, spectrum query, and/or spectrum request, the conflict check of block 60 may be carried out again to avoid a spectrum transaction that could lead to interference with existing or future spectrum use or use rights.

In the exemplary embodiment of FIG. 3, each block represents a transactional state during an exemplary spectrum exchange transaction, and each arrow represents a transition from one state to another as a result of an action by the user or by the holder. In some circumstances, the holder and/or the user may be replaced with a spectrum intermediary. As indicated, the dashed lines represent user actions, while the solid lines represent holder actions. Rectangular blocks represent user-designated states, and oval blocks represent holder-designated states.

A transactional process may begin in an initial bid state 70, where a user has submitted an initial bid for a spectrum offering listed on the spectrum exchange. The spectrum transfer tool 14 may notify the corresponding spectrum holder that an initial bid has been received and provide the holder with the details of the bid. For a make-an-offer-type offering, upon review of the initial bid, the holder may accept the bid, moving the transaction to an accepted state 72. For an auction-type offering, the transaction moves to the accepted state 72 once the auction time has run out and the highest bidder becomes apparent. After the transaction moves to the accepted state 72, the spectrum transfer tool 14 may create an invoice for the transaction and notify the user that payment of the bid price is due. The transaction may transition from the accepted state 72 to a closed state 74 once the user closes the transaction by paying the bid price.

As will be appreciated, the spectrum holder may participate in several competing transactional processes at once for the same spectrum offering when there are multiple bids for the offering. The competing bids may or may not have the same contents in terms of price, geographic area, frequency, and time. The holder may only accept one of several competing bids for the spectrum offering, unless the bids have sufficient separation in terms of geographical area, frequency, and time so as not to relate to the same spectrum or cause interference.

If a competing bid is found, the spectrum transfer tool 14 may notify the user of the competition and display the competing bid for the user's review. In light of the competing bid(s), the user may, for example, decide to modify the initial bid to increase the bid's chances of being accepted (e.g., "out-bid" the competition). If the user rebids (e.g., submits a modified bid for the spectrum offering), the transaction may transition from the initial bid state 70 to a rebid state 76. The competing bidders may repeat the rebidding process until, for example, there are no competing bids (e.g., a bidder stops rebidding), the holder accepts a bid, or the auction time ends.

After reviewing all the bids submitted for a spectrum offering, the holder may select one bid to accept or otherwise pursue using the transactional process. For example, the holder may accept the highest bid if the holder's main interest is financial gain. In some instances, the holder may decide to compromise on the terms of the spectrum offering. For example, the holder may accept a bid that specifies less than the entire offering.

From either the initial bid state 70 or the rebid state 76, the transaction may move to a declined state 78. The holder may decline an initial bid or rebid outright if the holder deems the bid to be unacceptable. For example, the holder may decline any bid that is below the holder's reserve price or ask price.

For a make-an-offer-type offering, the transaction may move to a counteroffer state 80 if, for example, the holder responds to the user's initial bid or rebid with a counteroffer. The holder may change the counteroffer, for example, before the user responds, as indicated by the arrow that circles back onto the counteroffer state 80. If the user accepts the holder's counteroffer, the transaction may move to a closed state 74. Alternatively, the user may choose to rebid in response to the holder's counteroffer, as shown by the arrow from the counteroffer state 80 to the rebid state 76. The holder and the user may continue counteroffering and rebidding back and forth until, for example, the parties agree on a price and the transaction moves to the closed state 74.

From the initial bid state 70, the transaction may move to the superseded state 82 if the initial bid is superseded by a preempting bid from a competing user. For example, a bid is superseded if the holder accepts a competing bid. Similarly, the transaction may move to the superseded state 82 from the rebid state 76. Furthermore, the transaction may move to the superseded state 82 from the counteroffer state 80 for a make-an-offer-type offering. For example, a counteroffer may be superseded by a preempting bid if the holder accepts a competing bid before the user responds to the counteroffer by closing the transaction. The spectrum transfer tool 14 may notify a user when their bid is superseded.

From either the counteroffer state 80 or the accepted state 72 for a make-an-offer-type offering, the transaction may move to a retracted state 84 if the holder decides to retract a counteroffer or an acceptance, respectively. For example, the holder may decide to retract a counteroffer if a user does not respond to the counteroffer within a set time period. As another example, the holder may decide to retract an acceptance if the user does not close the transaction within a set time period.

As will be appreciated, other transactional activities are possible during a spectrum exchange transaction, and the disclosed approach is not limited to the particular combination of transactional activities depicted in FIG. 3. For example, the holder may have the option of canceling the spectrum offering at any point before the accepted state 72 of the transactional process. As another example, for a make-an-offer-type offering, the user may have the option of withdrawing a bid at any point before the closed state 74 of the transactional process.

Using the above-described spectrum exchange transaction process, each spectrum user is able to compete for spectrum use rights by submitting bids and reassessing those bids, if needed, in light of competing bids and/or counteroffers. And each spectrum holder is able to choose the most desirable bid based on the holder's unique interests. In one embodiment, spectrum users transparently compete for spectrum offerings where competing bids are known to all parties. Therefore, it is contemplated that spectrum holders are able to secure the most competitive bids for their spectrum offerings. In other embodiments, competing bids may not be known to the other users, or portions of the bids may not be disclosed. In one embodiment, the transactional process may be open to observation by parties that are not involved in the transactional process, such as other holders, users, and/or spectrum intermediaries. This provides additional transparency to the process and the opportunity to pursue opportunities, such as posting an offering that may compete with or supplement an existing offering, place a competing bid, adjust future bidding and offering strategies, etc. In other embodiments, the transactional process may not be observable by third parties. In some embodiments, historical price information from closed spectrum transactions may be made available to all parties so as to help guide future negotiation for spectrum.

The automated spectrum exchange provides an efficient, time-saving, and cost-effective marketplace for the transfer of spectrum use rights. Holders may be able to derive value from unused or underutilized spectrum and users may be able to acquire spectrum for a wireless communications application. Furthermore, the exchange of spectrum use rights may establish market rates for spectrum that previously were more speculative in nature. In addition, following the closing of a transaction, the spectrum transfer tool 14 may automatically generate compliance documentation, electronically file the compliance documentation with the FCC or other regulatory body, and submit payment of regulatory fees associated with the filing. This feature alleviates compliance burdens on the parties. It is noted that one or both of the holder or the user may be responsible for the regulatory fees, and the negotiating process may determine who bears the responsibility. Alternatively, the holders and/or the users may agree to pay the fees as a precondition to using the exchange. Additional description of automated regulatory compliance may be found in U.S. patent application Ser. No. 12/327,920, filed Dec. 4, 2008, the disclosure of which is incorporated herein by reference in its entirety.

In one embodiment, each offering, counteroffer, bid, and rebid has a unified format in terms of how price, geographic area, frequency, and time are specified. In this manner, there is little or no variation in how different holders, users, and spectrum intermediaries interact with one another during transactional processes carried out though the spectrum exchange. As a result, the spectrum exchange hosted by the spectrum transfer tool 14 consistently operates in a uniform, regimented, and predictable manner for all interested parties. To address special circumstances relating to any one of an offer, a counteroffer, a bid, or a rebid, notes or comments may be appended to the relevant offer, counteroffer, bid, or rebid.

Figure 4A:
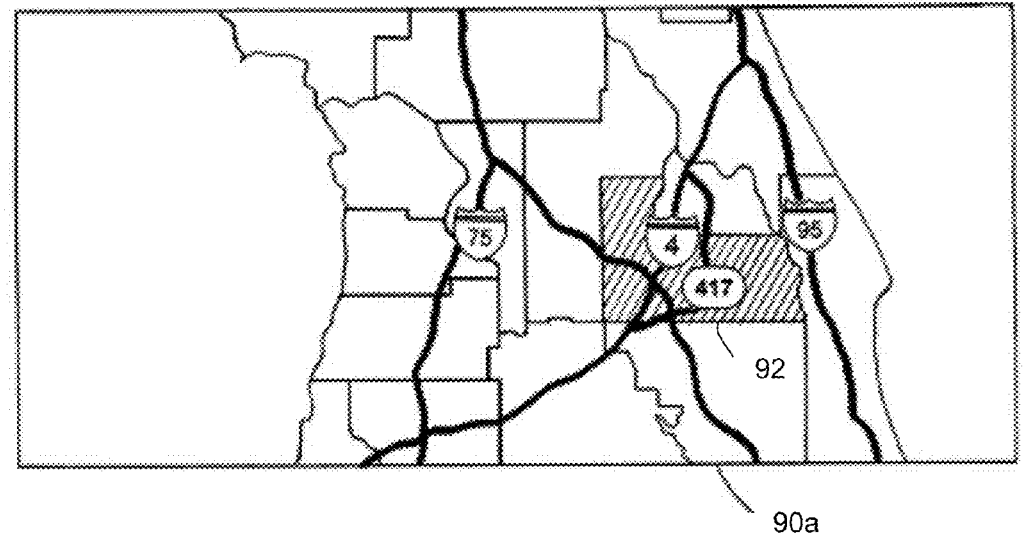
FIGS. 4A-4C depict exemplary maps that a spectrum holder or user may use to designate the geographical boundaries of specific spectrum.
Figure 4B:
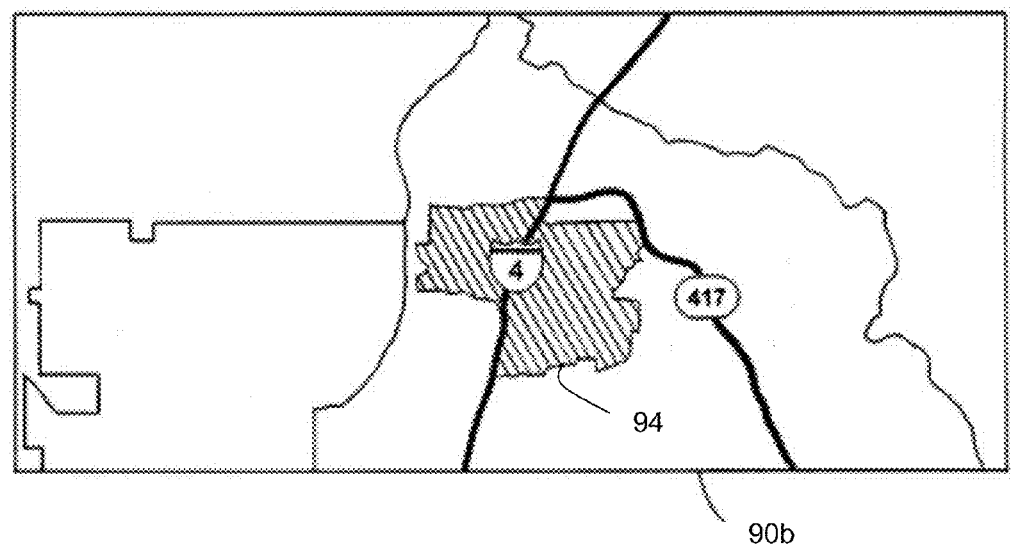
Figure 4C:
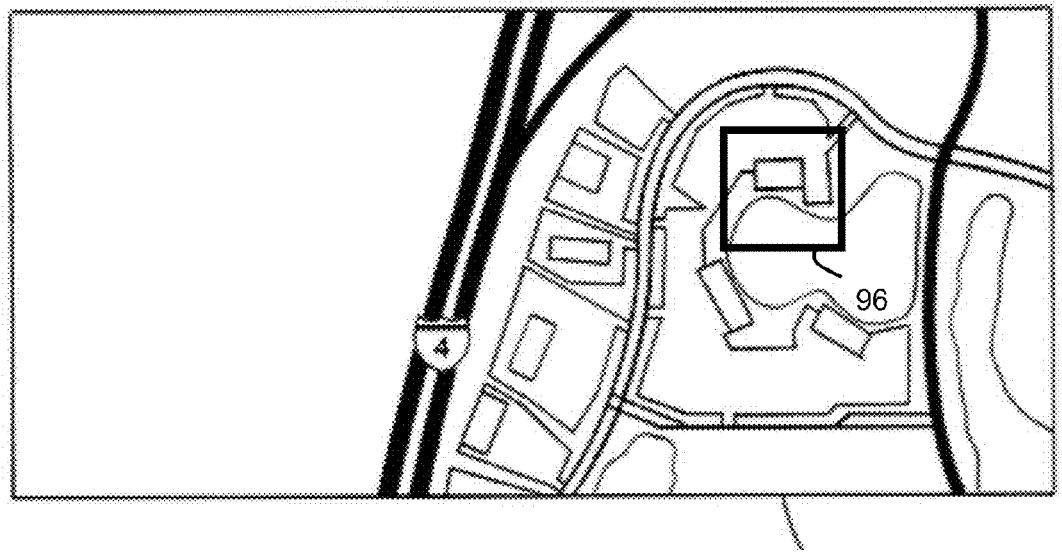
Figure 5:
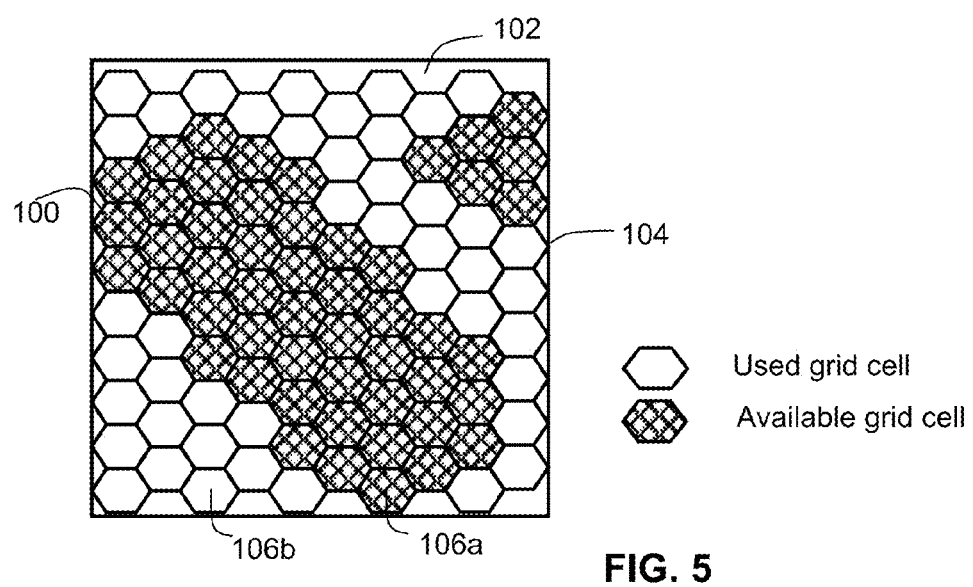
FIG. 5 depicts an exemplary frequency-geography grid layer overlaying a map.

With additional reference to FIGS. 4A through 4C and FIG. 5, illustrated are exemplary maps that may be used to designate the geographical boundaries of specific spectrum. FIGS. 4A-4C illustrate exemplary maps that may be provided by a mapping tool, while FIG. 5 shows an exemplary map that may be provided by a uniform partitioning tool. In an exemplary embodiment, the spectrum transfer tool 14 may include the mapping tool and/or the uniform partitioning tool. Alternatively, the mapping tool and/or the uniform partitioning tool may be included in the holder computer system 38, the spectrum user computer system 40, and/or the intermediary computer system 42. For example, the interface tool 44 may include the mapping tool and/or the uniform partitioning tool, and the tools 14, 44 may establish a graphical user interface, as described above.

The mapping tool facilitates the designation of geographical boundaries of spectrum being offered by spectrum holders and/or sought by spectrum users. In one embodiment, the mapping tool may allow the parties to select a desired geographical area by specifying commonly defined geographical regions. For example, a party may select a geographic region by designating a country, a state, a county, a city, a zip code, a census block, latitude/longitude coordinates, or any other boundaries as may be delineated by a user. A party also may select a geographic area based on an FCC delineation or other regulatory delineation. As is known in the art, the FCC has established multiple, and sometimes overlapping, categories for dividing the United States into areas or regions for the purpose of assigning area-based spectrum licenses, referred to herein as "FCC defined areas," such as the Major Trading Areas (MTAs) or the Basic Trading Areas (BTAs). Accordingly, a party may have a variety of options for designating a desired spectrum location based on pre-defined geographic regions.

In another embodiment, the mapping tool may allow a party to select an area of interest on the map by drawing a polygon that defines the geographical boundary of specific spectrum. By using the drawing function, a party is able to select a geographical region that, for example, is smaller than a zip code. As another example, the drawing function allows a party to select an unconventional geographical region, such as, for example, one that partially intersects more than one zip code, city, state, etc. In this manner, the mapping tool allows a party to delineate an exact spectrum region without being restricted by pre-defined geographic regions.

FIGS. 4A through 4C show exemplary maps 90 that a spectrum holder or user may use to designate the geographical boundaries of spectrum being offered and/or sought, as discussed above. FIG. 4A is an aerial map 90*a* of a region corresponding to a portion of central Florida, from which a party may select a more specific region. For example, in FIG. 4A, the map 90*a* shows the county lines in the depicted portion of central Florida. A county 92 has been selected and is highlighted on the map 90*a*. FIG. 4B is a map 90*b* that shows a close up of a portion of the county 92. Using the map 90*b*, a party may further identify the geographical region of interest. For example, in FIG. 4B, a zip code area 94 has been selected and is highlighted on the map 90*b*. In one embodiment, a party may specify a geographical region that is smaller than the zip code area 94 by drawing a polygon over the area of interest. For example, in FIG. 4C, an office park 96 has been selected by drawing a square on the exemplary map 90*c*.

In one embodiment, the maps may be satellite images. Other maps, such as street maps, combined satellite images and street maps, topological maps, etc. may be used. It will be appreciated that a party may select a geographic area in a variety of ways. In one embodiment, a party may progress from a larger regional map through maps of smaller regions, as illustrated in the progression from FIG. 4A to 4C. That is, a party can "zoom" in and out of the maps 90 when defining the geographical area of interest. Alternatively, a party may simply select the specific geographic area of interest without accessing intermediary maps or using a "zoom" function. In another embodiment, a party may draw a polygon on any sized map to select a specific area of interest. Additional description of a mapping tool that is used to define a geographical area may be found in U.S. patent application Ser. No. 12/256,645 filed Oct. 23, 2008, the disclosure of which is incorporated herein by reference in its entirety.

Once a party has defined a geographic area, the mapping tool may send data associated with the party's designated geographical boundaries to a uniform partitioning tool to create a spectrum usage map. Alternatively, the party may define a geographic area using the uniform partitioning tool by selecting one or more of the below-described grid cells.

FIG. 5 shows an exemplary grid layer 100 that is provided by the uniform partitioning tool. The grid layer 100 may overlay a map (e.g., 90) that includes a specified (e.g., defined) geographic area 102. In the illustrated example, the boundaries of the geographic area 102 are delineated by a rectangle 104 that may have been drawn by a party using, for example, the mapping tool, as discussed above. It will be appreciated that geographic area 102 may be of any shape and may be discontiguous.

The grid layer 100 uniformly partitions the geographic area 102 into uniform grid cells 106, such that each grid cell represents a portion of the geographic area 102 that falls the within the edges of the grid cell. The grid cells 106 created by the uniform partitioning tool may each have a unique identifier to provide unique indices to corresponding geographic areas. The grid layer 100 may be applied to the entire geographic area for which spectrum may be transferred using the spectrum exchange established by the spectrum transfer tool 14. In that manner, any geographic position or area for which spectrum may be offered, queried, requested, investigated, or exchanged may be identified using a standardized approach. For example, each grid cell may be assigned a unique grid identifier (GID). A GID may be a number, symbol, letters, etc., or any combination thereof. The GID for each grid cell may be listed in the database 16. In one embodiment, the uniform partitioning tool may be implemented using geographical information system (GIS).

Each grid cell (which also may be referred to as a zone) virtually represents a corresponding section of a geographic area, such as the geographic area serviced by the automated spectrum exchange through which holders may offer spectrum use rights and users may acquire spectrum use rights. Further, each GID is a value that represents a two dimensional area in a one dimensional manner. Each cell may be similar enough in size and shape so that each cell represents the same unit area (e.g., an acre, 0.75 square miles, 5 square kilometers, or any other size). In other embodiments, each GID is a value that represents a three dimensional area for use in wireless spectrum planning and rights exchanging (e.g., to allocate spectrum use rights in a skyscraper). The cells are preferably non-overlapping, but have boundaries that touch adjacent cells to form a contiguous virtual grid for the corresponding geographic area.

A spectrum usage map may be provided by the uniform partitioning tool by graphically presenting spectrum usage in the geographical areas represented by each grid cell. For example, in FIG. 5, grid cells 106*a* are highlighted to indicate that spectrum at a particular frequency is in use, either by the holder or by a spectrum user that has acquired use rights from the holder. Grid cells 106*b* are not highlighted, thereby indicating that spectrum at the particular frequency may be available for transfer. Thus, a party presented with grid layer 100 is able to easily identify the spectrum usage situation in geographical area 102 and apply this information when using the spectrum exchange. For example, when submitting a spectrum query or request, a spectrum user can specify a geographical area of interest by selecting one or more available grid cells 106*b* in the grid layer 100 corresponding to the user's area of interest 102. Offerings may be constructed in similar manner. Also, during the transactional process, bids, rebids, and counteroffers may involve selecting grid cells to define or redefine a geographical area. Alternatively, the user may formulate a search for available spectrum by selecting grid cells of interest in the grid layer 100. In this case, the search results may be presented to the user by displaying only the selected grid cells and highlighting the grid cells that are not available for transfer.

The uniform partitioning tool also allows a spectrum holder to easily manage the holder's licensed spectrum. For example, a holder may use the grid layer 100 to specify which grid cells 106 correspond to the geographical areas that are being used or are otherwise unavailable for transfer. Also, a holder may use the grid layer 100 to specify which grid cells 106 correspond to a geographical area being offered for transfer. Alternatively, the uniform partitioning tool may automatically populate the used or unused status of a grid cell based on known spectrum use, known lease information, and/or prior spectrum use rights transfers.

In the exemplary embodiment, the grid cells 106 are shaped as hexagons. According to the disclosed approach, the grid cells 106 are not limited to any particular type of shape, but preferably, the grid cells should be uniformly shaped. The uniformity of the grid cells may simplify identification of geographic areas for use in plotting spectrum use, depicting used and unused spectrum, establishing spectrum offerings, establishing spectrum bids, and/or establishing spectrum requests, and other tasks. Also, the uniform grid cells may assist in pricing spectrum offers and/or bids. For instance, price may be specified in a monetary amount (e.g., dollar) per grid cell, monetary amount per grid cell and per population, or monetary amount per grid cell and per megahertz.

The size of the grid cells 106 may be coordinated with the frequency of spectrum being mapped. For example, the grid cells 106 may be large enough so that the operation of radio hardware in a grid cell complies with regulatory requirements and/or avoids interference with other uses of spectrum.

As will be appreciated, spectrum cannot be adequately described by only specifying a geographical area. For example, each geographical area (whether a grid cell created by the uniform partitioning tool or a map area designated by the mapping tool) may be associated with one or more spectrum leases, where each lease specifies a unique frequency range and time interval combination. As an example, in a grid cell with an exemplary GID value of 1001, a first spectrum holder may have a lease for the 2500-2506 megahertz (MHz) channel, while a second spectrum holder may have a lease for the 2506-2512 MHz channel, and a third spectrum holder may have a lease for the 2660-2665 MHz channel. Similarly, in the geographical region corresponding to, for example, zip code area 94 in FIG. 4B, there may be more than 200 spectrum leases. Each of the above-mentioned leases may be for different time periods and/or frequency ranges. As a result, a spectrum transaction may be considered to involve at least four-dimensions (e.g., x and y geographical coordinates, time interval, and frequency range), making the implementation of the disclosed spectrum exchange platform a complicated endeavor.

To address the complexity of identifying spectrum and making spectrum matches, the spectrum transfer tool 14 may use a frequency-geography identifier (FGID) that has a standard format. This way, frequency and geography for any offering, bid, or request may be formatted in a common manner that may be matched to other offerings, bids, and/or requests in an easy manner. In one embodiment, each FGID represents a specific frequency or frequency range and an identifiable geographical area, such as a grid cell. Other formats may include a center frequency and bandwidth. An FGID may be a number, symbol, letters, etc., or any combination thereof. For example, the 2500-2506 MHz channel at grid cell GID 1001 may be represented by an FGID with a value of 1001-2.500-2.506. The FGIDs may be stored in the database 16 and may be used as unique indices that assist the retrieval and/or search of spectrum.

As an example, when a holder or user designates a geographical area and related spectrum, the data may be converted into an FGID for each corresponding grid cell. The frequency component of an FGID may have a predetermined size, such as 1 megahertz (MHz). Therefore, if the holder or user specified frequency in this example is 5 megahertz, there may be five FGIDs for each grid cell, where each FGID identifies a 1 megahertz component of the five megahertz. Also, if the user specifies spectrum as a function of an application, FCC part number, or radio equipment, the frequency component of the FGID may be determined by translating the provided information into all frequencies that may satisfy the input from the user. If a wide range of frequencies may satisfy the input, one or more FGIDs with wildcards may be constructed. For example, if any frequency in the range of 2500 MHz to 2599 MHz may be suitable, the FGID for the exemplary grid cell having GID value 1001 may be 1001-2.5xx. Therefore, based on FGID comparison, the spectrum transfer tool 14 may match spectrum queries to spectrum offerings that are listed in the database 16, as discussed above in connection with block 56 of FIG. 2.

Figure 6:
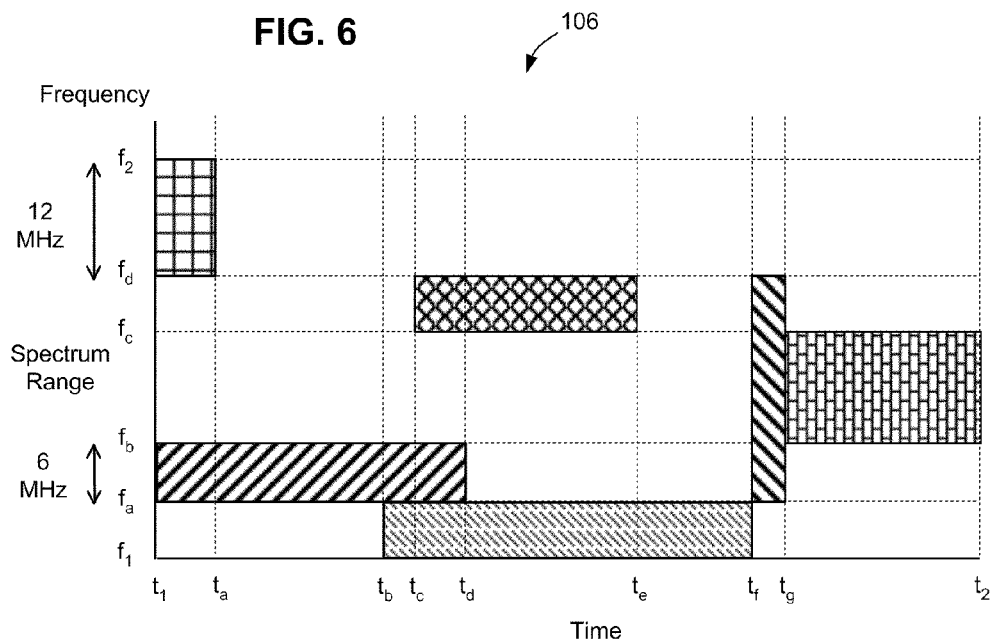
FIG. 6 is a schematic graph of the frequency ranges and time intervals of existing spectrum leases in a given geographical area.

With additional reference to FIG. 6, the spectrum transfer tool 14 further simplifies a spectrum transaction by transcribing the four-dimensions of spectrum into a two-dimensional graphical representation of spectrum usage based on frequency and time for a given geographical area. FIG. 6 illustrates an exemplary frequency vs. time graph 106 that shows spectrum usage for a given geographical area. Each shaded rectangle in the graph 106 represents a continuous block of spectrum usage that may be covered by, for example, a spectrum lease. Once a party selects a geographical area, the spectrum transfer tool 14 may use the frequency vs. time graph 106 to visually present spectrum usage in the selected geographical area. The geographical area may be selected by a party using, for example, the mapping tool and/or the uniform partitioning tool, as described above. In one embodiment, the spectrum transfer tool 14 may convert spectrum use, leases, and/or transfers into one or more FGIDs in order to facilitate, for example, the retrieval of and display of spectrum usage maps (e.g., a map similar to the map of FIG. 5 that is overlaid on a conventional geographic map of the relevant area) and/or spectrum usage graphs (e.g., a graph similar to the graph 106) for any geographic area, frequency range, and/or point in time or time range.

In the example of FIG. 6, the frequency usage is shown for a spectrum range of $f_1$ to $f_2$ for a time window or period of $t_1$ to $t_2$. Note that $t_1$ may be the current time, or it may be some designated time in the future at which a user may desire spectrum rights (or otherwise desire spectrum usage information). Time $t_1$ and/or $t_2$ may also be in the past should a user desire historical spectrum usage information. In addition, the frequencies $f_1$ and $f_2$ may define any frequency range about which a user may desire spectrum usage information.

It can be seen from FIG. 6 that at time $t_1$, spectrum having a frequency range of 6 MHz from $f_a$ to $f_b$ has been allocated, as well as spectrum having a frequency range of 12 MHz from $f_d$ to $f_2$. The spectrum from $f_a$ to $f_b$ has been allocated for a time window from time $t_1$ to $t_d$, and the spectrum from $f_d$ to $f_2$ has been allocated for a time window from time $t_1$ to $t_a$. As time proceeds from $t_1$ to $t_2$, the spectrum usage changes with differing frequency ranges becoming allocated and unallocated during such time period. For example, at time $t_c$, three frequency ranges are allocated, having frequency ranges $f_1$ to $f_a$, $f_a$ to $f_b$, and $f_c$ to $f_d$, respectively. The frequency range from $f_d$ to $f_2$ is no longer allocated because its usage expired at time $t_a$.

By providing a visualization of spectrum usage in a given geographical area in conjunction with the additional features disclosed above, the disclosed approach further simplifies a transaction involving spectrum use rights. As an example, using a frequency vs. time graph as shown in FIG. 6, a user may easily see which time intervals and frequency ranges are occupied by current spectrum usage in a given geographical area and accordingly tailor a spectrum query or spectrum request. In one embodiment, during a spectrum exchange transaction, other bids that compete with a user's bid may be presented to the user in the form of a frequency vs. time graph, where, for example, the user's bid and each of the competing bids are represented by blocks as shown in FIG. 6. In one embodiment, a party may select a grid cell from a map (e.g., the map of FIG. 5), and an associated frequency usage graph (e.g., 106) may be displayed for a specified or automatically determined frequency range and time interval.

The features and functions described in connection with FIGS. 5 and 6 may be used for the creation of spectrum offers, queries, and requests. They also may be used for researching current or future spectrum use, leases, and/or transfers of use rights. Historical pricing data for leases and/or transfers of use rights may be displayed. For instance, pricing data may be displayed over each of the blocks of the graph 106 where pricing data is known.

D. AUTOMATED OPTIMIZATION OF SPECTRUM ALLOCATION

Conventionally, in order to acquire use rights for spectrum that is not offered for transfer, or is otherwise unavailable, the interested user may manually develop a spectrum allocation proposal and approach each holder of spectrum included in the user's proposal. Or the holder may manually analyze spectrum licensed to the holder to provide a spectrum allocation solution that meets the interested user's spectrum needs. In many instances, a solution may not be readily apparent and may require tedious comparisons and several rounds of trial and error. And the complication only increases as more interested users approach the holder.

According to the disclosed approach, upon receipt of a request to make spectrum available, the automated spectrum exchange utilizes the above-described spectrum transfer tool 14 to facilitate the optimization of spectrum allocation to meet specific spectrum needs. In particular, unused and/or underutilized spectrum may be apportioned and/or allocated so as to satisfy a maximum number of spectrum requests made by spectrum users and/or spectrum intermediaries using the automated spectrum exchange.

Unused and/or underutilized spectrum may be referred to as unallocated spectrum for purposes of describing the techniques for optimizing spectrum allocation. Unallocated spectrum may include previously offered spectrum and/or newly available spectrum (e.g., spectrum that is newly posted on the spectrum exchange). Unallocated spectrum may be identified in other manners, such as manually by a holder and/or by automated detection of actual spectrum usage.

As mentioned above, spectrum requests may be submitted by a spectrum user or spectrum intermediary when suitable spectrum is not found using the spectrum exchange. As an example, a spectrum user may submit a spectrum query specifying a time interval of Jan. 1, 2009 (e.g., 12:00 am to 11:59 pm), a frequency range of 2500-2518 MHz, and a geographical area covering New York City. The spectrum user in this example may be interested in providing, for example, wireless communication services during the New Year's Day parade in downtown New York City. A search using the spectrum exchange reveals that while a matching spectrum offering exists, the time interval specified by the spectrum query overlaps with one or more previously arranged spectrum transfers. That is, spectrum pertaining to the 2500-2518 MHz frequency range in New York City is available for transfer, but not for the entire time interval submitted. In this example, modifying the spectrum query to, for example, another time interval (e.g., Jan. 2, 2009) or another location (e.g., upstate New York) would render the intended use obsolete. And the user's intended wireless application may only operate within a specific frequency range. Faced with the above dilemma, the user may decide to submit a request to make spectrum available that meets the user's needs.

Figure 7:
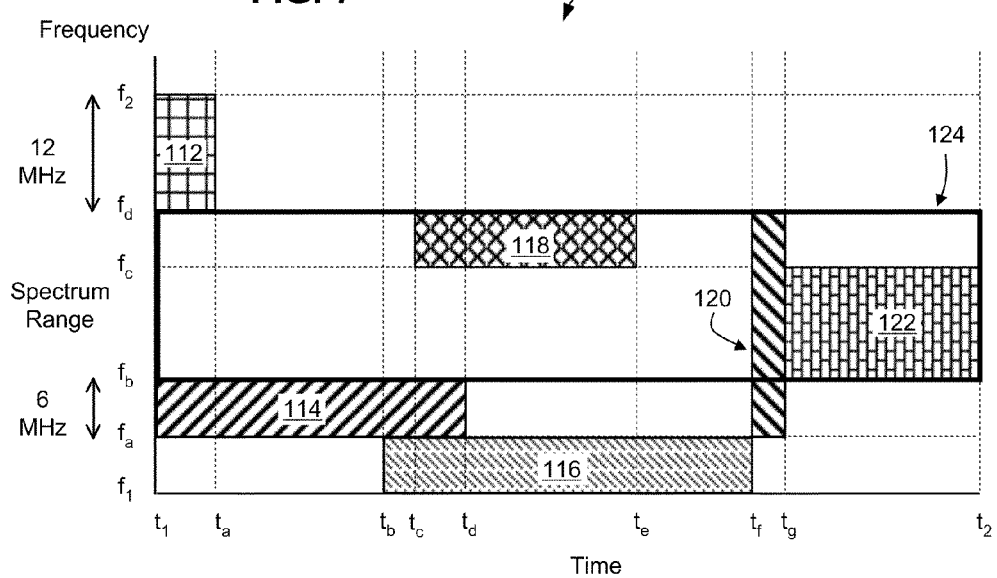
FIG. 7 is a schematic graph of the frequency ranges and time intervals of existing spectrum usage for a given geographical area and an associated request to make spectrum available.

With additional reference to FIG. 7, shown is an exemplary frequency vs. time graph 110 that is similar to graph 106, as described above with reference to FIG. 6. FIGS. 6 and 7 illustrate that, for a given geographical area, spectrum may be underutilized to the extent that the spectrum includes unallocated segments that are "scattered" between allocated blocks of spectrum (e.g., previously arranged spectrum use) in a manner that hinders the efficient allocation of unused spectrum. For example, as shown in graph 110 of FIG. 7, allocated spectrum blocks 112, 114, 116, 118, 120, and 122 are disjointed from each other in that the individual blocks do not form one continuous block of spectrum on the basis of frequency and/or time. Open or empty spaces located between the allocated spectrum blocks may represent portions of unallocated spectrum. As can be seen in FIG. 7, the unallocated spectrum segments are also disjointed from each other on the basis of frequency and/or time in that the unallocated spectrum segments do not form one continuous block of spectrum. Also shown in FIG. 7 is a spectrum request represented by rectangle 124 that specifies a frequency range of $f_b$ to $f_d$ for a time interval of $t_1$ to $t_2$. For example, spectrum request 124 may request coverage during the New Year's Day parade as in the example discussed above. As illustrated in FIG. 7, allocated spectrum blocks 118, 120, and 122 overlap with spectrum request 124. That is, the spectrum request 124 conflicts with previously arranged spectrum usage. As can be seen from FIG. 7, there is no continuous block of unallocated spectrum that may be matched to the spectrum request 124. This may explain why, for example, the spectrum user was unsuccessful in finding suitable spectrum on the spectrum exchange and decided to submit the request 124.

Figure 8:
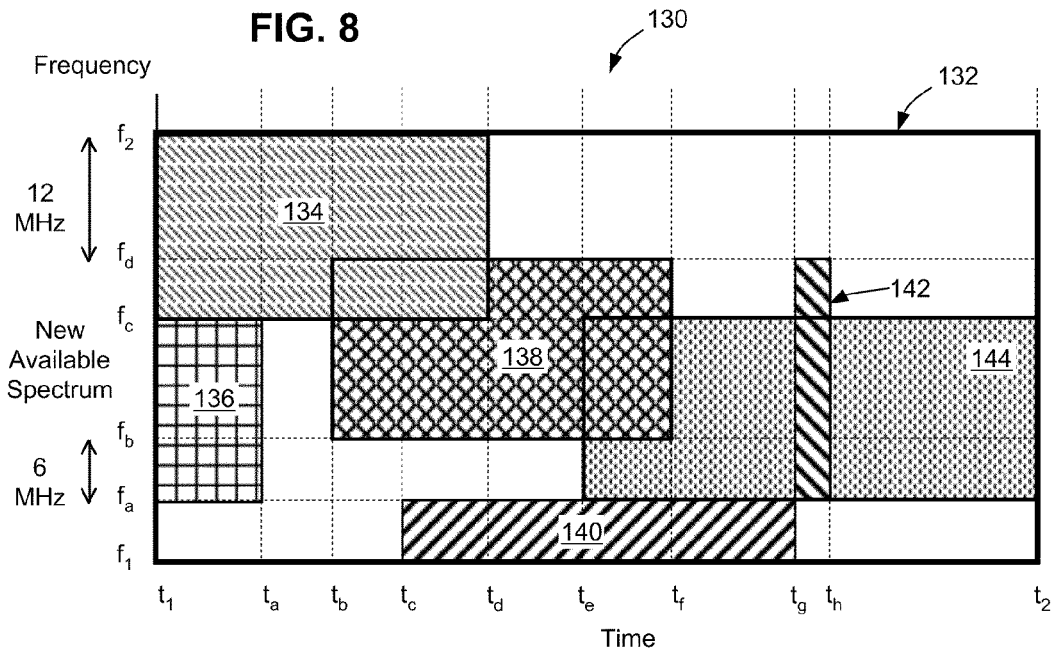
FIG. 8 is a schematic graph of the frequency ranges and time intervals of spectrum requests pertaining to newly available spectrum in a given geographical area.

The graph of FIG. 7 represents a conflict between desired spectrum and existing spectrum allocation. Other types of conflicts for efficiently allocating spectrum may exist, such as conflicts among competing spectrum requests or bids. With additional reference to FIG. 8, illustrated is an exemplary frequency vs. time graph 130 that shows a block of newly available spectrum 132 that is defined by a time interval of $t_1$ to $t_2$ and a frequency range of $f_1$ to $f_2$. As explained above, the spectrum exchange may use a spectrum request to solicit a new spectrum offering from a holder of spectrum that can fulfill the request. For example, the newly available spectrum 132 may have been posted to the spectrum exchange in response to one or more spectrum requests, such as, e.g., blocks 134, 136, 138, 140, 142, and 144. As can be seen in FIG. 8, request 134 conflicts (e.g., overlaps) with request 138, and request 138 conflicts with request 144. Request 144 also conflicts with request 142. As a result, requests 134, 138, 142, and 144 still are not fulfilled, despite newly available spectrum 132 being offered in response to the requests.

The disclosed approach addresses the above issues by using, for example, the spectrum transfer tool 14 to provide automated optimization of spectrum allocation within a given set of parameters. For example, to fulfill a spectrum request that conflicts with previously arranged spectrum use, the disclosed approach utilizes automated processes to virtually disaggregate unallocated spectrum associated with a spectrum offering into one or more segments and arrange the segments so as to fulfill the request in a manner that avoids conflict with existing spectrum usage. As another example, to allocate newly available spectrum among conflicting spectrum requests, the disclosed approach utilizes automated processes to virtually disaggregate newly available spectrum into segments and arrange the segments of spectrum so as to fulfill a plurality of spectrum requests, while limiting or minimizing conflict. It is possible, however, that there may be circumstances where interest in spectrum exceeds a spectrum availability. In these instances, not all users may be able to obtain the desired spectrum. But the natural forces of the above-described spectrum marketplace may be used to allocate spectrum to the party with the greatest ability to pay for the spectrum and/or force spectrum users to reduce the amount of spectrum that they are willing to use.

As mentioned above, spectrum may be disaggregated by virtually dividing the spectrum into one or more channels, each channel being defined by a width equal to the difference between an upper frequency and a lower frequency. And the total bandwidth of all disaggregated channels equals, but does not exceed, the entire spectrum bandwidth. Referring back to FIG. 7, the graph 110 represents spectrum that has been disaggregated into several channels, including, for example, a 6 MHz channel from $f_a$ to $f_b$ and a 12 MHz channel from $f_d$ to $f_2$. A device for providing a wireless communication services to an end user may be configurable to operate on any one of a number of channels within a specified frequency range, or on multiple channels that may or may not be contiguous in frequency. The device may also be configurable to "hop" from one frequency channel to another while providing wireless communication. For example, the device may provide wireless communication over one frequency channel for a time period. Then at the start of the next time period, the device may switch to a second frequency channel, and so on. The disclosed approach may apportion unallocated spectrum so as to allow the device to provide "seamless" (or "transparent") wireless communication service to an end user. That is, the end user has no indication that a device is frequency hopping in order to provide the services being used by the end user (e.g., no channel break up). Furthermore, in order to provide continuous wireless communication service without interruption over time, the disclosed approach may aggregate unallocated spectrum segments so that each request is fulfilled with spectrum having use rights that are consecutive in terms of time.

Figure 9:
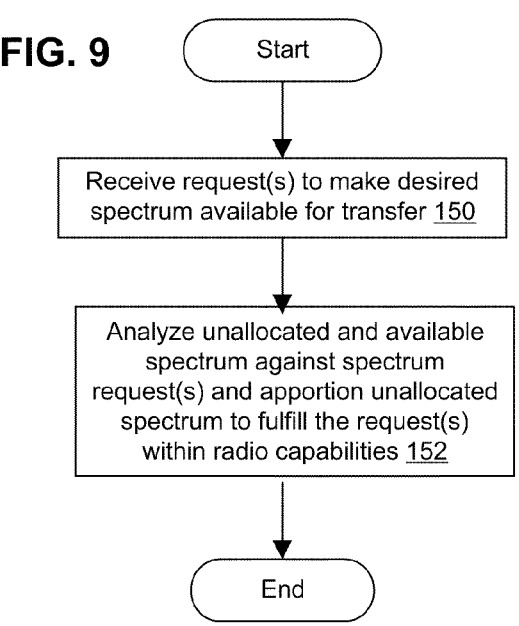
FIG. 9 is a flow chart representing an exemplary method of providing automated optimization of spectrum allocation to fulfill spectrum needs.

FIG. 9 illustrates an exemplary logical flow of steps that may be used to support the automated optimization of spectrum allocation according to the disclosed approach. This process may start in block 150 where the spectrum transfer tool 14 receives one or more requests to make desired spectrum available for transfer from, for example, a spectrum user or a spectrum intermediary. The spectrum request may include information defining aspects of desired spectrum, including frequency range or channel plan, geographical area, time interval, application and desired throughput, or any combination thereof. For example, the spectrum request may define desired spectrum using GID and/or FGID information. The spectrum user or intermediary may use the interface tool 44 to submit the spectrum request in a manner similar to a spectrum query submission, as described above. In one embodiment, the spectrum transfer tool 14 provides the user with the option of transforming a spectrum query directly into a spectrum request, e.g., using the interface tool 44. This option may be used when the user submits a spectrum request based on an unsuccessful spectrum query and the user is still interested in the spectrum specified by the query. The spectrum request may also include information to identify one or more spectrum offerings that may have fulfilled the spectrum request if conflicting spectrum usage had not existed. If the requested spectrum is not posted as a spectrum offering on the spectrum exchange, the spectrum request may include information indicating the lack of an associated spectrum offering.

Spectrum requests also may include information about the radios used by the user. The radio information may indicate frequencies on which the radios may operate. This information may be provided directly (e.g., as a frequency range or as channel data) or indirectly (e.g., as radio make and model number from which transmission/reception capabilities may be ascertained by the spectrum transfer tool 14).

The information collected in connection with the request may be used by the spectrum transfer tool 14 to identify spectrum that satisfies the spectrum interests of the user, even if the identified spectrum does not directly match the spectrum specified in the request. This matching process will be described in greater detail below.

For purposes of this description, it will be assumed that there is a condition in place where the spectrum request cannot be directly fulfilled with available unallocated spectrum. Such conditions may include, for example, an existing allocation of spectrum that poses a conflict, a conflict with another request, and/or a lack of a spectrum offering that makes directly matching spectrum available. As will be described, the spectrum transfer tool 14 may apportion available spectrum to fill the request(s) by allocating spectrum that is available and within the communications capacity of the user's or users' radio equipment. Had there been exactly matching spectrum, the logical flow may prompt the associated end user to enter the above-described transactional process. Alternatively, the optimization of spectrum allocation may be carried out even when directly matching spectrum exists to attempt to fulfill multiple requests and/or maximize spectrum usage.

As indicated, a spectrum request may prompt a holder to post an offering that matches the request or that makes alternative spectrum available. Also, available spectrum may become allocated to one or more users. Therefore, the spectrum supply is dynamic and the automated optimization of spectrum allocation may be correspondingly dynamic to "keep up" with changes in spectrum availability and demand. Also, spectrum that is allocated using the optimization process may be reallocated based on new spectrum availability from the presence of a new offer, a new spectrum request, and/or the termination of a spectrum allocation. Therefore, spectrum that is allocated to a user may be de-allocated so that the spectrum may be allocated to another user. The de-allocated spectrum may be replaced with alternative spectrum so that the user does not lose operating capability.

When spectrum is allocated using the optimization process, an allocation between available spectrum and a request may automatically generate a transfer of spectrum use rights that allows the user to use the associated spectrum. Alternatively, an allocation may place the allocated spectrum into a temporary escrow state and the parties may enter a transactional process to agree on price and/or other terms for the transfer of use rights in the spectrum. If an agreement is made, a transaction is established and the spectrum becomes fully allocated. If an agreement is not made, the spectrum is returned to the available spectrum pool.

Similarly, the spectrum request database stores all spectrum requests received by the spectrum transfer tool 14. The spectrum request database may be continuously updated to reflect the fulfillment of spectrum requests using the spectrum transfer tool 14. For example, a request may be removed from the database once the user has completed a transaction for obtaining use rights associated with the requested spectrum.

Following block 150, the logical flow continues to block 152, where the spectrum transfer tool 14 identifies unallocated spectrum that may fulfill the request or requests of block 150. In addition, the unallocated spectrum may be apportioned and/or aggregated to fill the requests to the greatest extent possible. In identifying unallocated spectrum, any portion of a spectrum offering that has not been allocated may be considered unallocated spectrum. For example, the spectrum transfer tool 14 may retrieve information defining aspects of the offered spectrum (e.g., frequency range, geographical area, time interval, etc.), spectrum license information, and details about previously arranged leases, subleases, and/or transfers pertaining to the offered spectrum. Based on the retrieved information, the spectrum transfer tool 14 may compare, for example, the frequency range and time interval of the associated spectrum offering with that of previously arranged transfers and leases in order to identify unallocated portions of offered spectrum. The spectrum transfer tool 14 may continuously identify unallocated spectrum posted on the automated spectrum exchange. For example, the spectrum transfer tool 14 may continuously monitor the spectrum usage database to determine if there are any unallocated portions of offered spectrum. As another example, the spectrum transfer tool 14 may continuously monitor the spectrum offering database to determine if any newly available spectrum has been posted on the spectrum exchange.

In one embodiment, the spectrum transfer tool 14 identifies unallocated spectrum pertaining to a spectrum offering associated with previously arranged spectrum use. For instance, as represented in FIG. 7, spectrum for a given geographical area may be represented as a collection of frequency and time coordinates that may be plotted on, for example, a frequency vs. time graph (e.g., graph 110). Recognizing that the blocks need not be rectangular, each allocated spectrum block in FIG. 7 is associated with at least four coordinates corresponding to the four corners that define the block. Block 112, for example, is delineated by time coordinates $t_1$ and $t_a$ and frequency coordinates $f_d$ and $f_2$. As can be seen in FIG. 7, the "empty slots" (e.g., open channels) between the allocated spectrum blocks may represent unallocated spectrum that is offered for transfer. The spectrum transfer tool 14 is able to derive the frequency and time coordinates for the unallocated spectrum based on the coordinates for the allocated spectrum blocks.

Unallocated spectrum data may be stored in a spectrum supply database. For example, frequency and time coordinates associated with unallocated spectrum may be stored in the database to allow convenient access when apportioning and/or aggregating unallocated spectrum to fulfill spectrum requests, as described in greater detail below. In one embodiment, when a spectrum request is received, the request may be compared to entries in the spectrum supply database to identify matching unallocated spectrum.

As indicated, the spectrum transfer tool 14 may apportion and/or aggregate unallocated spectrum to fulfill each spectrum request. Taking into account other requests for spectrum, if any, the spectrum transfer tool 14 chooses an apportionment plan (e.g., an arrangement of unallocated spectrum that fulfills the spectrum request(s)) that optimizes spectrum allocation. Apportionment of unallocated spectrum may include, for example, disaggregation of unallocated spectrum into segments and arrangement of the segments to fulfill a spectrum request without overlapping with existing spectrum usage (e.g., see FIG. 10 which is explained in more detail below). Apportionment of unallocated spectrum may also include disaggregation of newly available spectrum into segments and arrangement of the segments so as to fulfill a plurality of spectrum requests without conflict (e.g., FIG. 11 also explained in more detail below). In one embodiment, following fulfillment of the request with available spectrum, the requesting user may acquire use rights in the spectrum in an automated manner. In another embodiment, the fulfilling spectrum may be placed into a bid format and the requesting user may enter into the above-described transactional process with the corresponding spectrum holder (or holders) to acquire use rights to the spectrum.

In some instances, the logical flow may end without fulfilling one or all spectrum requests. While the spectrum transfer tool 14 facilitates the optimization of spectrum allocation overall, it may not be possible to accommodate every request in every situation. As will be appreciated, once available spectrum is allocated, the remaining requests may not be fulfilled with that spectrum. As another example, if a large number of conflicting requests are made for a specific segment of spectrum, all requests may not be accommodated. Thus, one or more requesting users may be omitted from an apportionment plan. The spectrum transfer tool 14 may notify the user if a request cannot be accommodated. The user may be provided with the option of modifying the unfulfilled request. In one embodiment, the spectrum transfer tool 14 may allow the holder to choose between conflicting requests or resolve the spectrum allocation using the transactional process described above where each user may compete for unallocated spectrum by submitting bids and rebids.

Figure 10:
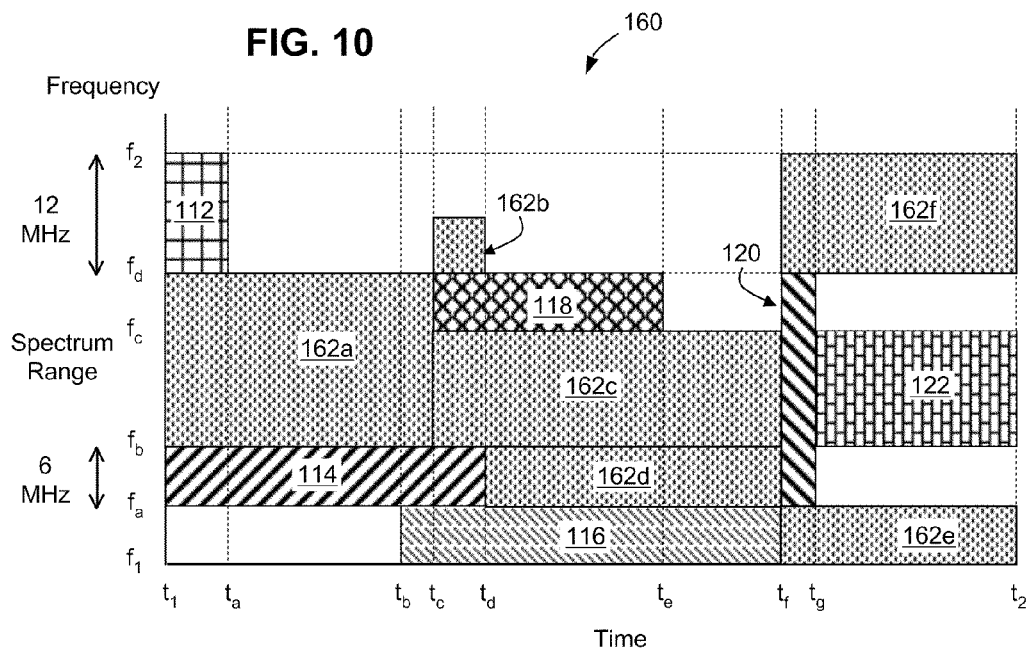
FIG. 10 is the schematic graph of FIG. 7 showing apportionment of unallocated spectrum to satisfy the spectrum request.
Figure 11:
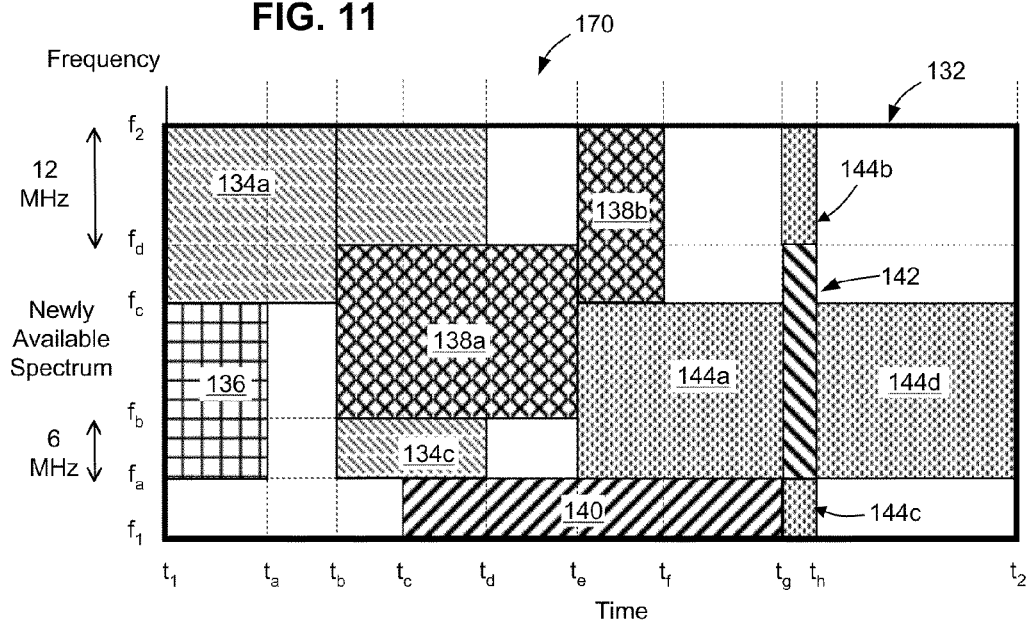
FIG. 11 is the schematic graph of FIG. 8 showing apportionment of newly available spectrum to satisfy several spectrum requests.

With additional reference to FIGS. 10 and 11, illustrated in each is an exemplary plan for apportioning unallocated spectrum to fulfill the spectrum request(s). In each example, it is contemplated that there may be more than one way to apportion the unallocated spectrum to fulfill the same spectrum request(s). In one embodiment, the spectrum transfer tool 14 may provide the user with optional apportionment plans and may allow the user to select one of the options and/or to modify one of the options. In another embodiment, the spectrum transfer tool 14 may obtain approval from the holder of the unallocated spectrum before presenting an apportionment plan to the requesting user. The holder also may be provided with a selection of alternative apportionment plans from which to choose. In some instances, the holder may not approve a proposed apportionment plan, for example, if the holder does not want to transfer use rights in a relatively small segment of spectrum.

FIG. 10 illustrates a frequency vs. time graph 160 that shows graph 110 of FIG. 7 with the addition of an exemplary apportionment plan to fulfill the request 124. In FIG. 10, unallocated spectrum is disaggregated in blocks 162a, 162b, 162c, 162d, 162e, and 162f in order to fulfill spectrum request 124. As can be seen in FIG. 10, due to the presence of conflicting spectrum usage (e.g., blocks 118, 120, and 122), not all of the disaggregated blocks 162 are within the frequency channel defined by rectangle 124 (e.g., $f_b$ to $f_d$). In the illustrated example, from $t_1$ to $t_c$, spectrum represented by block 162a provides coverage for the entire requested frequency channel. From $t_c$ to $t_d$, spectrum represented by block 162b is aggregated with a portion of the spectrum represented by block 162c to provide the requested frequency channel. From $t_d$ to $t_f$, the remaining portion of spectrum represented by block 162c is aggregated with spectrum represented by 162d to provide the requested frequency channel. From $t_f$ to $t_2$, spectrum represented by block 162f is aggregated with spectrum represented by block 162e to provide the requested frequency channel. In the above-described manner, the various blocks 162 are aggregated to provide continuous spectrum use within the time interval $t_1$ to $t_2$ as specified by the request 124.

FIG. 11 illustrates a frequency vs. time graph 170 that shows graph 130 of FIG. 8 with the addition of an exemplary apportionment plan. In FIG. 8, spectrum requests 134, 138, 142, and 144 for newly available spectrum 132 were overlapping (e.g., conflicting). As shown in FIG. 11, each of the overlapping spectrum requests may be fulfilled using non-overlapping blocks that, in the aggregate, satisfy the requested bandwidth amounts. For example, the aggregation of blocks 134a, 134b, and 134c fulfills spectrum request 134. Similarly, the aggregation of blocks 138a and block 138b fulfills spectrum request 138. And the aggregation of blocks 144a, 144b, and 144c fulfills spectrum request 144.

In effect, fulfilling spectrum in the foregoing manners shifts a portion of the request along the frequency axis to an unallocated portion of spectrum. The time interval and total amount of frequency of the spectrum request remains constant. For instance, in the example of FIG. 11, due to the overlap between block 134 and block 138, block 134c is shifted down to an open slot in channel $f_a$ to $f_b$. Similarly, due to the overlap between block 138 and block 144, block 138b is shifted up to an open slot in channel $f_c$ to $f_2$. And due to the overlap between block 144 and block 142, block 142b is shifted up to an open slot in channel $f_d$ to $f_2$ and block 144c is shifted down to an open slot in channel $f_1$ to $f_a$. In the above-described manner, a number of conflicting spectrum requests may be fulfilled by newly available spectrum 132. Viewed in another manner, not only is unallocated spectrum disaggregated and/or aggregated to fulfill a request, the spectrum request may be shifted in frequency, at least in part, and/or disaggregated. For instance, in the example of FIG. 10, spectrum request 124 may be divided into blocks 162 and arranged within the empty slots (e.g., unallocated spectrum blocks) of graph 160 so as to avoid overlap with the allocated spectrum blocks. It will be appreciated that spectrum from multiple offers may be used in fulfilling one or more requests. In one embodiment, fulfilling a request with spectrum from multiple holders may be made as a last option or not used to avoid transactions involving one user and plural holders.

According to one approach, apportionment of unallocated spectrum may be implemented using a two-dimensional bin packing algorithm that is constrained in the time domain. The bin packing algorithm may be designed to identify an optimal configuration of blocks within specified constraints. Based on the frequency and time coordinates provided by the spectrum transfer tool 14, the bin packing algorithm may create a finite number of "bins" (e.g., unallocated spectrum blocks) and "fill" (e.g., allocate) these bins with "objects" (e.g., complete or partial spectrum requests) so that the number of bins used is minimized. Using the bin packing algorithm, newly available spectrum, for example, may be efficiently allocated to a number of conflicting requests.

As another example, a computational process that is constrained by existing spectrum usage may be used to efficiently allocate unallocated spectrum to fulfill a spectrum request. The computational process may identify open channels of spectrum (e.g., unallocated spectrum) using the frequency and time coordinates provided by the spectrum transfer tool 14. The process then may combine (e.g., aggregate) enough open channels to fulfill the spectrum request, while complying with the specified constraints.

The techniques described herein are exemplary and are not meant to limit the disclosed approach. Other techniques may be used to implement the functionalities described above, as will be appreciated.

E. CONCLUSION

Various processes to support the establishment of an automated spectrum exchange and the optimization of spectrum allocation have been described. Using the disclosed approach, efficient and productive use of spectrum may be made, while minimizing the procedural and transactional burdens on spectrum holders and/or spectrum users.

Although certain embodiments have been shown and described, it is understood that equivalents and modifications falling within the scope of the appended claims will occur to others who are skilled in the art upon the reading and understanding of this specification.

What is claimed is:

1. A computer implemented method for allocating spectrum for wireless communications, comprising:
   maintaining a database of spectrum that has been offered by spectrum holders for use by spectrum users, the offered spectrum changing dynamically over time as new spectrum offers become available from spectrum holders, as spectrum offers elapse, and as spectrum availability from the holders changes, and identifying portions of the offered spectrum that have been allocated to spectrum users, the remainder of the offered spectrum being unallocated spectrum;
   receiving by the processor of the computer a request for spectrum from a user, the request specifying aspects of desired spectrum including, a time duration, a geographic area and frequency-related spectral data in at least one of plural formats;
   identifying a lack of available spectrum from the offered spectrum to fulfill the specified aspects in the request due to at least one of a conflict with an existing spectrum allocation, a conflict with another spectrum request, or the lack of matching offered spectrum; and
   apportioning to the user unallocated spectrum from spectrum offers from one or more different spectrum holders that when aggregated fulfill the request with unallocated spectrum that matches the time duration and the geographic area aspects of the request and that is discontinuous in frequency during the time duration, wherein the apportioning includes matching the frequency-related spectral data to the unallocated spectrum by classifying the frequency-related spectral data and the unallocated spectrum using a common classification system.

2. The method of claim 1, further comprising transferring use rights in the apportioned spectrum used to fulfill the request to the corresponding user.

3. The method of claim 1, further comprising hosting a transactional process between the user corresponding to the request and the holder of the apportioned spectrum so that the user and holder come to agreement on a price for the spectrum and, upon agreement, transferring use rights in the apportioned spectrum used to fulfill the request to the corresponding user.

4. The method of claim 1, wherein the allocated and unallocated spectrum is represented using a frequency versus time graph for a corresponding geographic location.

5. The method of claim 4, wherein each allocated spectrum segment and each unallocated spectrum segment has coordinates on the graph to define a corresponding polygon.

6. The method of claim 4, wherein the apportioning is carried out using a two-dimensional bin packing algorithm that is constrained in the time domain.

7. The method of claim 4, further comprising displaying the graph with the request graphically overlaid on the graph.

8. The method of claim 7, further comprising displaying a conflicting request by graphically overlaying the conflicting request on the graph.

9. The method of claim 4, wherein a total area of the request with respect to the graph equals a total area of the apportioned spectrum to fulfill the request.

10. A system for allocating spectrum for wireless communications, comprising:
- a memory that maintains a database of spectrum that has been offered by spectrum holders for use by spectrum users, the offered spectrum changing dynamically over time as new spectrum offers become available from spectrum holders, as spectrum offers elapse, and as spectrum availability from the holders changes, and the database identifying portions of the offered spectrum that have been allocated to spectrum users, the remainder of the offered spectrum being unallocated spectrum;
- a network interface over which a request for spectrum from a user is received, the request specifying aspects of desired spectrum including a time duration, a geographic area and frequency-related spectral data in at least one of plural formats; and
- a processor configured to:
- identify a lack of available spectrum from the offered spectrum to fulfill the specified aspects in the request due to at least one of a conflict with an existing spectrum allocation, a conflict with another spectrum request, or the lack of matching offered spectrum; and
- apportion to the user unallocated spectrum from spectrum offers from one or more different spectrum holders that when aggregated a corresponding spectrum offer to fulfill the request with unallocated spectrum that matches the time duration and the geographic area aspects of the request and that is discontinuous in frequency during the time duration, wherein the apportioning includes matching the frequency-related spectral data to the unallocated spectrum by classifying the frequency-related spectral data and the unallocated spectrum using a common classification system.

11. The system of claim 10, wherein use rights in the apportioned spectrum used to fulfill the request are transferred to the corresponding user.

12. The system of claim 10, wherein the processor is further configured to host a transactional process between the user corresponding to the request and the holder of the apportioned spectrum so that the user and holder come to agreement on a price for the spectrum and, upon agreement, to transfer use rights in the apportioned spectrum used to fulfill the request to the corresponding user.

13. The system of claim 10, wherein the allocated and unallocated spectrum is represented using a frequency versus time graph for a corresponding geographic location.

14. The system of claim 13, wherein each allocated spectrum segment and each unallocated spectrum segment has coordinates on the graph to define a corresponding polygon.

15. The system of claim 13, wherein the apportionment of unallocated spectrum is carried out using a two-dimensional bin packing algorithm that is constrained in the time domain.

16. The system of claim 13, wherein the processor is configured to generate display data from which the graph is displayed with the request graphically overlaid on the graph.

17. The system of claim 16, wherein the display data further includes display data to display a conflicting request by graphically overlaying the conflicting request on the graph.

18. The system of claim 13, wherein a total area of the request with respect to the graph equals a total area of the apportioned spectrum to fulfill the request.

19. A computer readable medium storing executable code that when executed by a processor allocates spectrum for wireless communications, comprising code to:
- maintain a database of spectrum that has been offered by spectrum holders for use by spectrum users, the offered spectrum changing dynamically over time as new spectrum offers become available from spectrum holders, as spectrum offers elapse, and as spectrum availability from the holders changes, and the database identifying portions of the offered spectrum that have been allocated to spectrum users, the remainder of the offered spectrum being unallocated spectrum;
- receive a request for spectrum from a user, the request specifying aspects of desired spectrum including a time duration, a geographic area and frequency-related spectral data in at least one of plural formats;
- identify a lack of available spectrum from the offered spectrum to fulfill the specified aspects in the request due to at least one of a conflict with an existing spectrum allocation, a conflict with another spectrum request, or the lack of matching offered spectrum; and
- apportion to the user unallocated spectrum from spectrum offers from one or more different spectrum holders that when aggregated fulfill the request with unallocated spectrum that matches the time duration and the geographic area aspects of the request and that is discontinuous in frequency during the time duration, wherein the apportioning includes matching the frequency-related spectral data to the unallocated spectrum by classifying the frequency-related spectral data and the unallocated spectrum using a common classification system.

20. The method of claim 1, wherein the formats for the frequency-related spectral data include a frequency range, a channel plan, wireless application and throughput, frequencies on which radio equipment of the user is operational, and radio equipment identity.

21. The method of claim 1, further comprising identifying spectrum associated with the each spectrum offer by a frequency identifier value that corresponds to frequency-related parameters of the spectrum and that is selected from a predetermined set of frequency identifier values, the frequency identifier values being the common classification system.

22. The method of claim 21, further comprising classifying the frequency-related spectral data for the spectrum sought by the spectrum user as specified as part of the request for spectrum using the same set of frequency identifier values, the respective frequency identifier values used to match needs of the spectrum user to the communications support capabilities of the unallocated spectrum.

23. The method of claim 1, comprising:
- de-allocating spectrum that was previously allocated to a first user and re-allocating the de-allocated spectrum to a second user; and
- replacing the de-allocated spectrum with alternative spectrum to maintain fulfillment of the request and so that the first user does not lose operating capability for a period of time corresponding to the de-allocated spectrum.

24. The method of claim 1, wherein the apportioning includes:
- disaggregating the unallocated spectrum by virtually dividing the unallocated spectrum into a plurality of channels, each channel defined by a bandwidth equal to the difference between an upper frequency for the channel and a lower frequency for the channel; and
- drawing from the channels to fulfill the request.

25. The system of claim 10, wherein formats for the frequency-related spectral data include a frequency range, a channel plan, wireless application and throughput, frequencies on which radio equipment of the user is operational, and radio equipment identity.

26. The system of claim 10, wherein the processor is further configured to identify spectrum associated with the each spectrum offer by a frequency identifier value that corresponds to frequency-related parameters of the spectrum and that is selected from a predetermined set of frequency identifier values, the frequency identifier values being the common classification system.

27. The system of claim 26, wherein the processor is further configured to classify the frequency-related spectral data for the spectrum sought by the spectrum user as specified as part of the request for spectrum using the same set of frequency identifier values, the respective frequency identifier values used to match needs of the spectrum user to the communications support capabilities of the unallocated spectrum.

28. The system of claim 10, wherein the processor is further configured to: de-allocate spectrum that was previously allocated to a first user and re-allocate the de-allocated spectrum to a second user; and replace the de-allocated spectrum with alternative spectrum to maintain fulfillment of the request and so that the first user does not lose operating capability for a period of time corresponding to the de-allocated spectrum.

29. The system of claim 10, wherein the processor is further configured to: disaggregate the unallocated spectrum by virtually dividing the unallocated spectrum into a plurality of channels, each channel defined by a bandwidth equal to the difference between an upper frequency for the channel and a lower frequency for the channel; and draw from the channels to fulfill the request.

* * * * *

UNITED STATES PATENT AND TRADEMARK OFFICE
CERTIFICATE OF CORRECTION

PATENT NO. : 8,073,458 B2  
APPLICATION NO. : 12/328191  
DATED : December 6, 2011  
INVENTOR(S) : Randall C. Chang Page 1 of 1

It is certified that error appears in the above-identified patent and that said Letters Patent is hereby corrected as shown below:

Column 31, Claim 10, Lines 25-26, should read -- when aggregated fulfill the request with unallocated spectrum that matches --.

Signed and Sealed this
Twentieth Day of March, 2012

David J. Kappos
*Director of the United States Patent and Trademark Office*